(12) United States Patent
Ganapathy et al.

(10) Patent No.: US 6,408,376 B1
(45) Date of Patent: Jun. 18, 2002

(54) METHOD AND APPARATUS FOR INSTRUCTION SET ARCHITECTURE TO PERFORM PRIMARY AND SHADOW DIGITAL SIGNAL PROCESSING SUB-INSTRUCTIONS SIMULTANEOUSLY

(75) Inventors: Kumar Ganapathy, Mountain View; Ruban Kanapathipillai, Dublin, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/652,100

(22) Filed: Aug. 30, 2000

Related U.S. Application Data

(63) Continuation-in-part of application No. 09/494,608, filed on Jan. 31, 2000, and a continuation-in-part of application No. 09/427,174, filed on Oct. 25, 1999, now abandoned.

(51) Int. Cl.[7] .............................. G06F 9/22; G06F 9/40; G06F 9/44

(52) U.S. Cl. .............................. 712/36; 712/35; 712/41; 712/215; 712/228; 712/227; 712/245; 709/108

(58) Field of Search .............................. 710/7, 54, 20, 710/35, 61, 118, 125, 131, 260; 712/241, 219, 215, 36, 25, 32, 31, 34, 7, 35, 37, 225, 38, 41, 227, 42, 223, 43, 206, 201, 203, 23, 24, 20.6, 228, 217, 42.4, 245, 21, 22; 711/168; 709/108; 717/9, 5

(56) References Cited

U.S. PATENT DOCUMENTS

| | | |
|---|---|---|
| 4,969,118 A | 11/1990 | Montoye et al. |
| 5,142,677 A | 8/1992 | Ehlig et al. ................. 709/108 |
| 5,241,492 A | 8/1993 | Giradeau, Jr. |
| 5,341,374 A | 8/1994 | Lewen et al. |
| 5,530,663 A | 6/1996 | Garcia et al. |

(List continued on next page.)

OTHER PUBLICATIONS

Minoli & Minoli: Chapter 5, Technology and Standards for Low–Bit–Rate Vocoding Methods; Delivering Voice over IP Networks; 1998; pp. 149–233; Robert Ipsen Pub.

Texas Instruments SMJ320C80 Digital Signal Processor Data Sheet; Document No. SGUS025; Aug. 1998; Texas Instruments.

(List continued on next page.)

*Primary Examiner*—Daniel H. Pan
(74) *Attorney, Agent, or Firm*—Blakely, Sokoloff, Taylor & Zafman LLP

(57) ABSTRACT

Disclosed is a method, apparatus, and an instruction set architecture (ISA) for an application specific signal processor (ASSP) tailored to digital signal processing (DSP) applications. The instruction set architecture implemented with the ASSP, is adapted to DSP algorithmic structures. In one embodiment, a single DSP instruction includes a pair of sub-instructions: a primary DSP sub-instruction and a shadow DSP sub-instruction. Both the primary and the shadow DSP sub-instructions are dyadic DSP instructions performing two operations in one instruction cycle. The DSP operations, in one embodiment, include a multiply instruction (MULT), an addition instruction (ADD), a minimize/maximize instruction (MIN/MAX), and a no operation instruction (NOP). Each signal processing unit includes a primary stage to execute a primary DSP sub-instruction based upon current data and a shadow stage to simultaneously execute a shadow DSP sub-instruction based upon delayed data stored locally within registers of the signal processing units. Control logic is utilized to control shadow selectors of each signal processing unit to select delayed data (specified by the shadow DSP sub-instruction) for use by the shadows stages of the signal processing units. In this way, the present invention efficiently executes DSP instructions by simultaneously executing primary DSP sub-instructions (based upon current data) and shadow DSP sub-instructions (based upon delayed locally stored data) with a single DSP instruction thereby performing four operations per single instruction cycle.

33 Claims, 25 Drawing Sheets

U.S. PATENT DOCUMENTS

| | | | |
|---|---|---|---|
| 5,541,917 A | | 7/1996 | Farris |
| 5,559,793 A | | 9/1996 | Maitra et al. |
| 5,574,927 A | | 11/1996 | Scantlin |
| 5,638,524 A | | 6/1997 | Kiuchi et al. |
| 5,727,194 A | * | 3/1998 | Shridhar et al. ............ 712/241 |
| 5,748,977 A | | 5/1998 | Kawasaki et al. |
| 5,761,470 A | | 6/1998 | Yoshida |
| 5,822,613 A | * | 10/1998 | Takaki et al. .................. 710/7 |
| 5,825,685 A | | 10/1998 | Ginetti et al. |
| 5,826,072 A | | 10/1998 | Knapp et al. |
| 5,838,931 A | | 11/1998 | Regenold et al |
| 5,880,984 A | | 3/1999 | Burchfiel et al. |
| 5,881,060 A | | 3/1999 | Morrow et al. |
| 5,901,301 A | | 5/1999 | Matsuo et al. |
| 5,923,871 A | | 7/1999 | Gorshtein et al. |
| 5,940,785 A | | 8/1999 | Georgiou et al. |
| 6,029,267 A | | 2/2000 | Simanapalli et al. |
| 6,138,136 A | | 10/2000 | Bauer et al. |
| 6,154,828 A | | 11/2000 | Macri et al. |

OTHER PUBLICATIONS

William Stallings, Computer Organization and Architecture 4th Edition, 1993, pp. 313–386, Prentice–Hall, Inc. Upper Saddle River, NJ.

Richard Fromm and David Martin, Instruction Set Architecture Simulation Infrastructure and Application Development for Vector IRAM, ilpsoft.eecs.berkeley.edu.9636/~ilpsoft/99abstracts/rfromm.1.html, Oct. 1999.

Tep Dobry, Instruction Set Architecture, Web Based Course by UC Berkeley Undergradute Advisor, Date posted Aug. 20, 1999, www–ee.eng.hawaii.edu/~tep/EE461/Notes/ISA/isa.html.

Jim McCormick, Supporting Predicated Execution: Techinques and Tradeoffs, Ms thesis, Department of Electrical and Comuputer Engineering University of Illinois, Urbana, IL, 5/96.

R65C00/21 Dual CMOS Microcomputer and R65C29 Dual CMOS Microprocessor; Rockwell 1984 Data Book; Rockwell International; Document No. 29651N64; pp. 3–1–3–32.

* cited by examiner

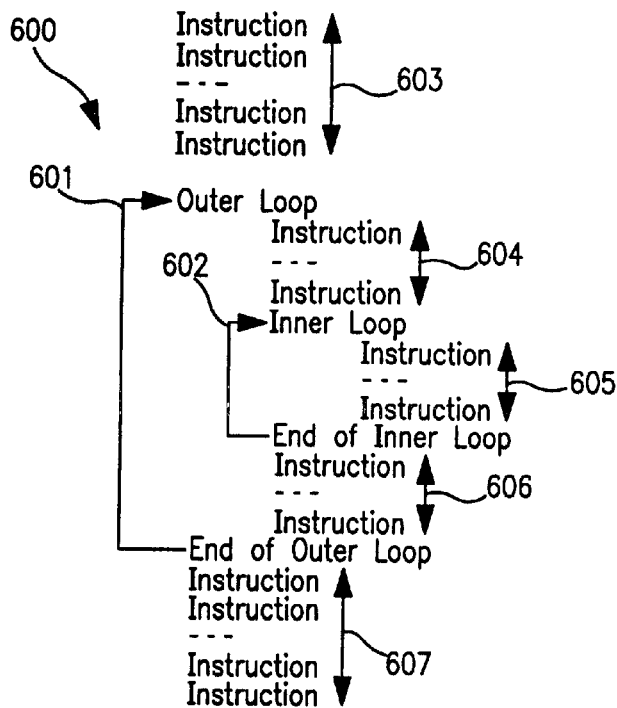
FIG. 6A
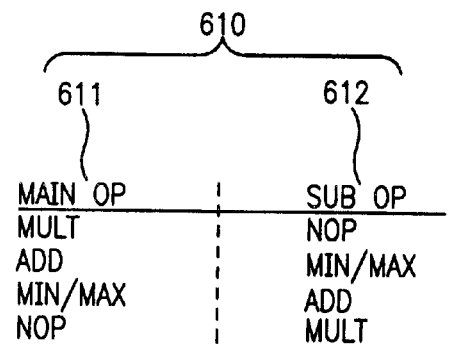
FIG. 6G
| 20-bit ISA | 39 | 19 | | | |
|---|---|---|---|---|---|
| | 0 | 0 | 20-bit parallel | Control ∥ Control |
| | 0 | 1 | 20-bit serial | Control # Control |
| | 1 | 0 | 40-bit extended | DSP, extensions/Shadow |
| | 1 | 1 | 20-bit serial | DSP # DSP |
FIG. 6B 6-bit operand specifier:

A 6-bit specifier is used in DSP extended instructions to access memory and register operands.

| 5 | 4 | 3 | 2 | 1 | 0 | | |
|---|---|---|---|---|---|---|---|
| M/R | | | | | | | |
| 0 | 0 | ac-page | | | | ereg | |
| 0 | 1 | gpr:r0-r15 | | | | GPR | |
| 1 | ptr:(r0)to(r15) | | | | off | Mem[ptr{0-15}]∥ PTR[0-15]+=offset1/offset2 | Always postupdate |

This allows access to data memory, ereg and GPR

- Bit 5=1: Use rX(X:0-7) register to obtain effective memory address and post-modify the ptr field by one of two possible offsets specified in rX registers.
  dmem[ptr], ptr=ptr+offset1, if off=0
              ptr=ptr+offset2, if off=1
- Bit 5=0: Access ac-page or GPR If Bit-4 is set to 0, then bits 3:0 control access to the general-purpose register file (r0-15) or to execution unit registers.

| GPR | GPR Intr page | ac-page | ac intr page | ereg-Shadow DSP |
|---|---|---|---|---|
| R0 | R0 | A0 | A0_i | A0 |
| R1 | R1 | A1 | A1_i | A1 |
| R2 | R2 | T | T | T |
| R3 | R3 | TR | TR | TR |
| R4 | R4 | | | |
| R5 | R5 | | | |
| R6 | R6 | | | |
| R7 | R7 | | | |
| R8 | R8 | | | SX1 |
| R9 | R9 | | | SX1s |
| R10 | R10 | | | SX2 |
| R11 | R11 | | | SX2s |
| R12 | R12_i | | | SY1 |
| R13 | R13_i | | | SY1s |
| R14 | R14_i | | | SY2 |
| R15 | R15_i | | | SY2s |

FIG. 6C

For shadow DSP instructions, the 3-bit specifier for operands is defined as follows:

| 2 | 1 | 0 | |
|---|---|---|---|
| 0 | 0 | 0 | A0 |
| 0 | 0 | 1 | A1 |
| 0 | 1 | 0 | T |
| 0 | 1 | 1 | TR |
| 1 | 0 | 0 | SX1 |
| 1 | 0 | 1 | SX1s |
| 1 | 1 | 0 | SX2 |
| 1 | 1 | 1 | SX2s |

EREG1

| 2 | 1 | 0 | |
|---|---|---|---|
| 0 | 0 | 0 | A0 |
| 0 | 0 | 1 | A1 |
| 0 | 1 | 0 | T |
| 0 | 1 | 1 | TR |
| 1 | 0 | 0 | SY1 |
| 1 | 0 | 1 | SY1s |
| 1 | 1 | 0 | SY2 |
| 1 | 1 | 1 | SY2s |

EREG2

Only the shadow DSP instructions can see the above modified page of execution unit registers.

FIG. 6E 4-bit operand specifier:

Memory operands: (rX) specifies an access out of the data memory to the execution unit for the function that needs to be performed. The address for the access is specified in the rX register in the general register file that hold the 14-bit pointer (16K of addressing) to memory, 5-bit signed offset or a 3-bit unsigned offset that can post-modify the address. In addition each pointer is typed for efficient SIMD processing and includes a permute control for rearranging data elements of a vector on the fly. The "podi" core can deal with 4-element 16-bit real vectors or complex data directly. This ability to manipulate memory data directly reduces the instruction width greatly and allows efficient signal processing.

(rX): Memory Address Registers

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|----|---|---|---|---|---|---|---|---|---|---|
| type | | | cb | x | permute | | | | off1:(0-7) | | | | off0:(-16 to 15) | | | | | | ptr: pointer | | | | | | | | | | | | |

FIG. 6D

5-bit operand specifier:

The 5-bit specifier includes the 4-bit specifier for general data operands and the special purpose registers. It is used in RISC instructions.

| 4 | 3 | 2 | 1 | 0 |
|---|---|---|---|---|
| 0 | spr:s0–s15 | | | |
| 1 | gpr:r0–r15 | | | |

| | SPR | SPR Intr_page | |
|---|---|---|---|
| 0 | fu-ctl | fu-ctl_I | |
| 1 | a-type | a-type_I | |
| 2 | ps-ctl | ps-ctl | |
| 3 | t-type | t-type | |
| 4 | pl-ctl | pl-ctl | |
| 5 | cb-ctl | cb-ctl_I | |
| 6 | shuffle | shuffle | |
| 7 | io-ptr | io-ptr | |
| 8 | status | status_I | |
| 9 | loop-ctl | loop-ctl | |
| 10 | pcr | pcr | stack(8) |
| 11 | reserved | reserved | |
| 12 | reserved | reserved | |
| 13 | reserved | reserved | |
| 14 | reserved | reserved | |

NOTE: All SPR registers are reset to all zeros at power on reset except for the PCR register.

FIG. 6F

DSP instructions

| | 39 | 38 | 37 | 36 | 35 | 34 | 33 | 32 | 31 | 30 | 29 | 28 | 27 | 26 | 25 | 24 | 23 | 22 | 21 | 20 | |
|---|---|---|---|---|---|---|---|---|---|---|---|---|---|---|---|---|---|---|---|---|---|
| Multiply | 1 | 0 | 0 | PS | S' | colspan SX | | | | colspan SY | | | | | V/S | SA | DA | colspan Sub-op | | | |

| | bits 39–23 | 22 | 21 | 20 | |
|---|---|---|---|---|---|
| Multiply `1 0 0 PS S' SX SY V/S SA DA` | | | | | |
| da=sx∗sy | | 0 | 0 | 0 | Nop |
| da=(sx∗sy)+sa | | 0 | 0 | 1 | Add |
| da=(sx∗sa)+sy | | 0 | 1 | 0 | Add |
| da=(sx∗sy)+sa | | 0 | 1 | 1 | Sub |
| da=(sx∗sa)+sy | | 1 | 0 | 0 | Sub |
| da=min(sx∗sy,sa) | | 1 | 0 | 1 | Min |
| da=min(sx∗sa,sy) | | 1 | 1 | 0 | Min |
| da=max(sx∗sy,sa) | | 1 | 1 | 1 | Max |
| Add `1 0 1 PS +/- SX SY V/S SA DA` | | | | | |
| da=sx+sy | | 0 | 0 | 0 | Nop |
| da=sx+sy+sa | | 0 | 0 | 1 | Add |
| da=sx+sy; sa=sx+sy; | | 0 | 1 | 0 | AddSub |
| da=(sx+sy)∗sa | | 0 | 1 | 1 | Mul |
| da=-(sx+sy)∗sa | | 1 | 0 | 0 | MulN |
| da=min(sx+sy,sa) | | 1 | 0 | 1 | Min |
| da=max(sx+sy,sa) | | 1 | 1 | 0 | Max |
| da=ssum(sa)  (sx,sy unused) | | 1 | 1 | 1 | CombAdd |
| Extremum `1 1 0 PS X/N SX SY V/S SA DA` | | | | | |
| da=ext(sx,sy) | | 0 | 0 | 0 | Nop |
| da=ext(sx,sy,sa) | | 0 | 0 | 1 | Ext |
| da=ext(sx,sa)∗sy | | 0 | 1 | 0 | Mul |
| da=-ext(sx,sa)∗sy | | 0 | 1 | 1 | MulN |
| da=ext(sx,sa)+sy | | 1 | 0 | 0 | Add |
| da=ext(sx,sa)-sy | | 1 | 0 | 1 | Sub |
| ext(sa,da) t=sx,tr=sy,lcs=lc | | 1 | 1 | 0 | amax |

| | 39 | 38 | 37 | 36 | 35 | 34–30 | 29–25 | 24 | 23 | 22 | 21 | 20 | |
|---|---|---|---|---|---|---|---|---|---|---|---|---|---|
| type-match | 1 | 1 | 0 | PS | 0 | SX | SY | x | x | 0 | 1 | 1 | |
| nop | 1 | 1 | 0 | PS | 0 | x x x x x | x x x x x | x | x | 1 | 1 | 1 | |
| Permute | 1 | 1 | 0 | PS | 1 | Type | SY | 0 | ereg | 1 | 1 | 1 | Permute |
| Reserved | 1 | 1 | 1 | PS | x | SX | SY | SA | DA | V/S | Sub-op | | |

FIG. 6H

Control and specifier Extensions

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|

Mul

| 0 | Pred | PL | Sxt | Syt | Rnd | Lt | S' | S' | S' | 0 | SA | DA | abs | 0 | 0 |
|---|---|---|---|---|---|---|---|---|---|---|---|---|---|---|---|

Add

| 0 | Pred | PL | Sxt | Syt | Lt | Sub-ext | 0 | SA | DA | abs | 0 | 0 |
|---|---|---|---|---|---|---|---|---|---|---|---|---|
|  |  |  |  |  |  | +/- | +/- | +/- | x |  |  |  |  |  |  |
|  |  |  |  |  |  | x | V/S | Rnd | Fp |  |  |  |  |  |  |
|  |  |  |  |  |  | tr/ctl | Gx | Fp |  |  |  |  |  |  |  |

Nop (uadd)
Mul/MulN
Min/Max

Ext

| 0 | Pred | PL | Sxt | Syt | tr-ctl | Gx | Sub-ext | 0 | SA | DA | abs | 0 | 0 |
|---|---|---|---|---|---|---|---|---|---|---|---|---|---|
|  |  |  |  |  |  |  | Lt | Fp |  |  |  |  |  |
|  |  |  |  |  |  |  | Rnd | Lt |  |  |  |  |  |

Add/sub
Mul

| 0 | Pred | PL | Pctl2 | Syt | Pctl1 | 0 | ereg | Pctl3 | 0 | 0 |
|---|---|---|---|---|---|---|---|---|---|---|

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0 | Pred | PL | x | Type:SX | Type:SY | 0 | SA | DA | x | 0 | 1 |
| 0 | Pred | PL | Psx | Permute:SX | Permute:SY | 0 | SA | DA | Psy | 1 | 0 |
| 0 | Pred | I/R | I/R | prX | Offset:SX | Offset:SY | 0 | SA | DA | prY | 1 | 1 |

Type override
permute override
Offset override

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0 | Op | PL | op | SA | ereg1 | DA | ereg2 | 1 | SA | DA | Sub-op |

| 1 | 1 | 0 | PL | 0 | x | x | x | Rnd | x | x | x | 0 | SA | DA | 1 | 1 | 1 |
|---|---|---|---|---|---|---|---|---|---|---|---|---|---|---|---|---|---|

FIG. 6I

Control instructions

| | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| add,sub | L | Pred | | | 0 | 0 | 0 | RX | | | | RY | | | RZ | | | | +/- | 0 |
| max,min | L | Pred | | | 0 | 0 | 0 | RX | | | | RY | | | RZ | | | | X/N | 1 |
| Shift | L | Pred | | | 0 | 0 | 1 | RX | | | UI4 | | | | RZ | | | UI2 | R/L | |
| Logic | L | Pred | | | 0 | 1 | 0 | RX | | | | RY | | | RZ | | | &, | &1 | |
| Mux | L | Pred | | | 0 | 1 | 1 | RX | | | | RY | | | RZ | | | Pd | | 0 |
| mov | L | Pred | | | 0 | 1 | 1 | RX | | | | DZ | | | Rxt | Dzt | 0 | 0 | 0 | 1 |
| addi | L | Pred | | | 0 | 1 | 1 | SI4 | | | | DZ | | | x | x | 1 | 0 | 0 | 1 |
| mov2erg | L | Pred | | | 0 | 1 | 1 | RX | | | unit | | ereg | | qd | N/B | 16/32 | 1 | 0 | 1 |
| Ldm | L | Pred | | | 0 | 1 | 1 | RX | | | | DZ1 | | | | DZ2 | | 1 | 1 | |
| Set4bits | L | Pred | | | 1 | 0 | 0 | UI4:POS | | | | RZ | | | Rzt | | UI4 | | | 0 |
| Set2bits | L | Pred | | | 1 | 0 | 0 | UI4:POS | | | | RZ | | | Rzt | UI2 | | 0 | 0 | 1 |
| Setbit | L | Pred | | | 1 | 0 | 0 | UI4:POS | | | | RZ | | | Rzt | UI1 | UI1 | 1 | 0 | 1 |
| Movi | L | Pred | | | 1 | 0 | 0 | SI8 | | | | | | | RZ | | | | 1 | 1 |
| Jmp | L | Pred | | | 1 | 0 | 1 | SI9 | | | | | | | 0 | PRED | | | 0 | 0 |
| Call | L | Pred | | | 1 | 0 | 1 | SI9 | | | | | | | 1 | PRED | | | 0 | 0 |
| Loop | L | Pred | | | 1 | 0 | 1 | UI5:Lcount | | | | UI5:Lsize | | | | | UI2:Lst | | 0 | 1 |
| Jmpi | L | Pred | | | 1 | 0 | 1 | RX | | | x | x | x | x | x | 0 | PRED | | 1 | 0 |
| Calli | L | Pred | | | 1 | 0 | 1 | RX | | | x | x | x | x | x | 1 | PRED | | 1 | 0 |
| Loopi | L | Pred | | | 1 | 0 | 1 | RX | | | x | UI5:Lsize | | | | | UI2:Lst | | 1 | 1 |
| Test | L | Pred | | | 1 | 1 | 0 | RX | | | | RY | | | PZ | | | =,<,> | | 0 |
| Testbit | L | Pred | | | 1 | 1 | 0 | RX | | | | UI5 | | | PZ | | | B | 0 | 1 |
| Andp, orp | L | Pred | | | 1 | 1 | 0 | Pa | | Pb | | Pc | | | PZ | | | & | 1 | 1 |
| Load | L | Pred | | | 1 | 1 | 1 | MX | | | | RZ | | | | Ext | | 0 | 0 | 0 |
| Store | L | Pred | | | 1 | 1 | 1 | MZ | | | | RZ | | | | Ext | | 1 | 0 | 0 |
| eLoad | L | Pred | | | 1 | 1 | 1 | MX | | | | RY | | | 1 | 1 | 1 | 0 | 0 | 0 |
| eStore | L | Pred | | | 1 | 1 | 1 | MZ | | | | RY | | | 1 | 1 | 1 | 1 | 0 | 0 |
| Extended | L | Pred | | | 1 | 1 | 1 | Bits 27:16 | | | | | | | | | | | 1 | 0 |
| Logic2 | L | Pred | | | 1 | 1 | 1 | RX | | | | RY/RZ | | | Rxt | Ryt | &,1,&1,! | | 0 | 1 |
| mov-erg | L | Pred | | | 1 | 1 | 1 | unit | | ereg | | RZ | | | qd | | Sft | | 1 | 1 |
| Crb | L | Pred | | | 1 | 1 | 1 | RX | | | | RZ | | | s/m | 0 | 0 | 1 | 1 | 1 |
| Parity | L | Pred | | | 1 | 1 | 1 | RX | | | | PZ | | 0/E | 0 | 1 | 0 | 1 | 1 | 1 |
| Stm | L | Pred | | | 1 | 1 | 1 | MZ | | | | RX | | | 1 | 1 | 0 | 1 | 1 | 1 |
| Abs | L | Pred | | | 1 | 1 | 1 | RX | | | | RZ | | | 0 | 0 | 0 | 1 | 1 | 1 |
| Neg | L | Pred | | | 1 | 1 | 1 | RX | | | | RZ | | | 0 | 1 | 1 | 1 | 1 | 1 |
| Div-step | L | Pred | | | 1 | 1 | 1 | RX | | | | RZ | | | 1 | 0 | 1 | 1 | 1 | 1 |
| Reserved | L | Pred | | | 1 | 1 | 1 | RX | | | | PZ | | 0 | 1 | 1 | 1 | 1 | 1 | 1 |
| Reserved | L | Pred | | | 1 | 1 | 1 | | | | 0 | 0 | 1 | 1 | 1 | 1 | 1 | 1 | 1 | 1 |
| Return | L | Pred | | | 1 | 1 | 1 | Pred | | I-ctl | 0 | 1 | 0 | 1 | 1 | 1 | 1 | 1 | 1 | 1 |
| Zero-ac | L | Pred | | | 1 | 1 | 1 | ac # | | | 1 | 1 | 0 | 1 | 1 | 1 | 1 | 1 | 1 | 1 |
| eSync | L | Pred | | | 1 | 1 | 1 | RZ | | | 0 | 1 | 1 | 1 | 1 | 1 | 1 | 1 | 1 | 1 |
| Swi | L | Pred | | | 1 | 1 | 1 | UI3 | | 0 | 1 | 1 | 1 | 1 | 1 | 1 | 1 | 1 | 1 | 1 |
| Nop | L | Pred | | | 1 | 1 | 1 | UI3 | | 1 | 1 | 1 | 1 | 1 | 1 | 1 | 1 | 1 | 1 | 1 |

<Bit1,Bits9-6>
==UI5 (Shift Amount)

Bit 5: 0= one ereg, 1= broadcast all tour; Bit4: 0= 16-bit, 1= 32-bit

<Bit3,Bits13-10>==UI5 POS

Where $SX_{ab}$ : S=Source; a=delay; b= SP unit number(e.g. SP3,SP2 SP1,SP0; or termed U3,U2,U1,U0)

---

$Y' = [\ SY_{10},\ SY_{11},\ SY_{12},\ SY_{13}\ ]$ $Y'' = [\ SY_{20},\ SY_{21},\ SY_{22},\ SY_{23}\ ]$

Where $SY_{ab}$ : S=Source; a=delay; b= SP unit number(e.g. SP3,SP2,SP1, SP0; or termed U3,U1,U0)

FIG. 8A

FIR Filter $\begin{bmatrix} X_0 \\ X_1 \\ \vdots \\ X_N \end{bmatrix} * \begin{bmatrix} Y_0 \\ \vdots \\ Y_N \end{bmatrix} = X_0Y_0 + X_1Y_1 \cdots X_NY_N$

| Primary Stage | Primary Stage Computations | | | |
|---|---|---|---|---|
| Cycle # | SP0 | SP1 | SP2 | SP3 |
| 1 | $X_0Y_0$ + | $X_1Y_1$ + | $X_2Y_2$ + | $X_3Y_3$ |
| 2 | $X_4Y_4$ + | $X_5Y_5$ + | $X_6Y_6$ + | $X_7Y_7$ |
| 3 | $X_8Y_8$ + | $X_9Y_9$ + | $X_{10}Y_{10}$ + | $X_{11}Y_{11}$ |
| ⋮ | | | | |
| N | $X_{N-3}Y_{N-3}$ + | $X_{N-2}Y_{N-2}$ + | $X_{N-1}Y_{N-1}$ + | $X_NY_N$ |

| Shadow Stage | Shadow Stage Computations | | | |
|---|---|---|---|---|
| Cycle # | SP0 | SP1 | SP2 | SP3 |
| 1 | No operation | | | |
| 2 | No operation | | | |
| 3 | $X_1Y_0$ + | $X_2Y_1$ + | $X_3Y_2$ + | $X_4Y_3$ |
| 4 | $X_5Y_4$ + | $X_6Y_5$ + | $X_7Y_6$ + | $X_8Y_7$ |
| ⋮ | | | | |
| N+2 | $X_{N-2}Y_{N-3}$ | $X_{N-1}Y_{N-2}$ + | $X_NY_{N-1}$ + | $X_{N+1}Y_N$ |

$\begin{bmatrix} X_1 \\ \vdots \\ X_{N+1} \end{bmatrix} * \begin{bmatrix} Y_0 \\ \vdots \\ Y_N \end{bmatrix}$
(Shuffle X' Left by one)

Subsequent Cycles

| Primary Stage | | | Shadow Stage | | |
|---|---|---|---|---|---|
| Cycle # N+1 ⋮ 2N | $\begin{bmatrix} X_2 \\ \vdots \\ X_{N+2} \end{bmatrix}$ | $* \begin{bmatrix} Y_0 \\ \vdots \\ Y_N \end{bmatrix}$ | Cycle # N+3 ⋮ N+5 | $\begin{bmatrix} X_3 \\ \vdots \\ X_{N+3} \end{bmatrix}$ | $* \begin{bmatrix} Y_0 \\ \vdots \\ Y_N \end{bmatrix}$ |
| N+4 ⋮ 3N | $\begin{bmatrix} X_4 \\ \vdots \\ X_{N+4} \end{bmatrix}$ | $* \begin{bmatrix} Y_0 \\ \vdots \\ Y_N \end{bmatrix}$ | N+5 ⋮ N+7 | $\begin{bmatrix} X_5 \\ \vdots \\ X_{N+5} \end{bmatrix}$ | $* \begin{bmatrix} Y_0 \\ \vdots \\ Y_N \end{bmatrix}$ |

FIG. 8B shuffle     Shuffle Control Register

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| u3 | u2 | u1 | u0 | u3 | u2 | u1 | u0 | u3 | u2 | u1 | u0 | u3 | u2 | u1 | u0 | u3 | u2 | u1 | u0 | u3 | u2 | u1 | u0 | u3 | u2 | u1 | u0 | u3 | u2 | u1 | u0 |
| SY2S | | | | | | | | SY1S | | | | | | | | SX2S | | | | | | | | SX1S | | | | | | | |

Units are connected to their nearest neighbors for shuffling the sources using the following bit diagram:

```
00   Unit N+1, SX1=X'    (right)
01   Unit N+1, SX2=X''   (right)
10   Unit N-1, SX1=X'    (left)
11   Unit N-1, SX2=X''   (left)
```

For example to shift the sources to the left by one:

| 3 | 2 | 1 | 0 | From |
|---|---|---|---|---|
| 2 | 1 | 0 | 3 | Into |

The bits should be 10101010 ($AA)

FIG. 8C

METHOD AND APPARATUS FOR INSTRUCTION SET ARCHITECTURE TO PERFORM PRIMARY AND SHADOW DIGITAL SIGNAL PROCESSING SUB-INSTRUCTIONS SIMULTANEOUSLY

CROSS REFERENCE TO RELATED APPLICATIONS

This application is a continuation-in-part application and claims the benefit of U.S. application Ser. No. 09/427,174, filed Oct. 25, 1999 now abandoned, by inventors Ganapathy et al, the disclosure of which prior application is hereby incorporated by reference, verbatim and with the same effect as though it were fully and completely set forth herein, both of which are to be assigned to Vxtel, Inc.

This application is also a continuation-in-part application and claims the benefit of U.S. application Ser. No. 09/494,608, filed Jan. 31, 2000 by inventors Ganapathy et al, the disclosure of which prior application is hereby incorporated by reference, verbatim and with the same effect as though it were fully and completely set forth herein, both of which are to be assigned to Vxtel, Inc.

FIELD OF THE INVENTION

This invention relates generally to the instruction set architectures (ISA) of processors. More particularly, the invention relates to instruction set architectures for the execution of operations within a signal processing integrated circuit.

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. However, when performing signal processing functions on data it is often desirable to perform other DSP operations in varying combinations.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fixed filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

In typical micro processors, a MAC operation would require a multiply instruction and an add instruction to perform both multiplication and addition. To perform these two instructions would require two processing cycles. Additionally, a program written for the typical micro processor would require a larger program memory in order to store the extra instructions necessary to perform the MAC operation. In prior art DSP devices, if a DSP operation other than a MAC DSP instruction needs to be performed, the operation requires separate arithmetic instructions programmed into program memory. These separate arithmetic instructions in prior art DSPs similarly require increased program memory space and processing cycles to perform the operation when compared to a single MAC instruction. It is desirable to reduce the number of processing cycles when performing DSP operations. It is desirable to reduce program memory requirements as well.

DSPs are often programmed in a loop to continuously perform accelerated arithmetic functions including a MAC instruction using different operands. Often times, multiple arithmetic instructions are programmed in a loop to operate on the same data set. The same arithmetic instruction is often executed over and over in a loop using different operands. Additionally, each time one instruction is completed, another instruction is fetched from the program stored in memory during a fetch cycle. Fetch cycles require one or more cycle times to access a memory before instruction execution occurs. Because circuits change state during a fetch cycle, power is consumed and thus it is desirable to reduce the number of fetch cycles. Typically, approximately twenty percent of power consumption may be utilized in the set up and clean up operations of a loop in order to execute DSP instructions. Typically, the loop execution where signal processing of data is performed consumes approximately eighty percent of power consumption with a significant portion being due to instruction fetching. Additionally, because data sets that a DSP device processes are usually large, it is also desirable to speed instruction execution by avoiding frequent fetch cycles to memory.

Additionally, the quality of service over a telephone system often relates to the processing speed of signals. That is particularly the case when a DSP is to provide voice processing, such as voice compression, voice decompression, and echo cancellation for multiple channels. More recently, processing speed has become even more important because of the desire to transmit voice aggregated with data in a packetized form for communication over packetized networks. Delays in processing the packetized voice signal tend to result in the degradation of signal quality on receiving ends.

It is desirable to provide improved processing of voice and data signals to enhance the quality of voice and data communication over packetized networks. It is desirable to improve the efficiency of using computing resources when performing signal processing functions.

BRIEF SUMMARY OF THE INVENTION

Briefly, the present invention includes an apparatus, method, instruction set architecture, and system as described in the claims. Multiple Application Specific Signal Processors (ASSPs) having the instruction set architecture of the present invention are provided within gateways in communication systems to provide improved voice and data communication over a packetized network. Each ASSP includes a serial interface, a buffer memory, and multiple core processors each to simultaneously process multiple channels of voice or data. Each core processor preferably includes at least one reduced instruction set computer (RISC) processor and multiple signal processing units (SPs). Each SP includes multiple arithmetic blocks to simultaneously process multiple voice and data communication signal samples for communication over IP, ATM, Frame Relay or other packetized network. The multiple signal processing units can execute the digital signal processing algorithms in parallel. Each ASSP is flexible and can be programmed to perform many network functions or data/voice processing functions, including voice and data compression/decompression in telecommunications systems (such as CODECs) particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units. The RISC ISA is a register based architecture including 16-registers within the register file, while the DSP ISA is a memory based architecture with efficient digital signal processing instructions.

The instruction word for the ASSP can be 20 bits, or can be expanded to 40 bits. The 40-bit instruction word can be used to control two instructions to be executed in series or parallel, such as two RISC control instructions, extended DSP instructions, or two 20-bit DSP instructions. The instruction set architecture of the ASSP has five distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, (4) a 40-bit DSP instruction that extends the capabilities of a 20-bit dyadic DSP instruction by providing powerful bit manipulation, and 5) a single 40-bit DSP instruction that includes a pair of 20-bit dyadic sub-instructions: a primary DSP sub-instruction and a shadow DSP sub-instruction that are executed simultaneously according to one embodiment of the present invention.

These instructions are for accelerating calculations within the core processor of the type where D=[(A op1 B) op2 C] and each of "op1" and "op2" can be a multiply, add, extremum (min/max) or other primitive DSP class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two basic DSP operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor. For example, the DSP instructions can process vector data or scalar data automatically using a single instruction and provide the appropriate vector or scalar output results.

In one embodiment of the present invention, a single DSP instruction includes a pair of sub-instructions: a primary DSP sub-instruction and a shadow DSP sub-instruction. Both the primary and the shadow DSP sub-instructions are dyadic DSP instructions performing two operations in one instruction cycle. These DSP operations include the MULT, ADD, MIN/MAX, and NOP operations as previously described.

According to one embodiment, each core processor has a plurality of signal processing units (SPs). Each of the SPs includes a primary stage to execute a primary DSP sub-instruction based upon current data and a shadow stage to simultaneously execute a shadow DSP sub-instruction based upon delayed data stored locally within delayed data registers of each SP. Each SP includes a shadow selector coupled to the delayed data registers of its own associated SP. Control logic is utilized to control the shadow selectors of each SP to select delayed data (specified by the shadow DSP sub-instruction) from the delayed data registers for use by the shadows stages of the SPs.

In this way, the present invention efficiently executes DSP instructions by simultaneously executing primary DSP sub-instructions (based upon current data) and shadow DSP sub-instructions (based upon delayed locally stored data) with a single DSP instruction thereby performing four operations per single instruction cycle per SP, without increasing the memory bandwidth.

BRIEF DESCRIPTIONS OF THE DRAWINGS

FIG. 6A is an exemplary instruction sequence illustrating a program model for DSP algorithms employing an instruction set architecture (ISA) according to one embodiment of the present invention.

FIG. 6B is a chart illustrating a pair of bits that specify differing types of dyadic DSP instructions of the ISA according to one embodiment of the present invention.

FIG. 6C lists a set of addressing instructions, and particularly shows a 6-bit operand specifier for the ISA, according to one embodiment of the present invention.

FIG. 6D shows an exemplary memory address register according to one embodiment of the present invention.

FIG. 6E shows an exemplary 3-bit specifier for operands for use by shadow DSP sub-instructions according to one embodiment of the present invention.

FIG. 6F illustrates an exemplary 5-bit operand specifier according to one embodiment of the invention.

FIG. 6G is a chart illustrating the permutations of the dyadic DSP instructions according to one embodiment of the invention.

FIGS. 6H and 6I show a bitmap syntax for exemplary 20-bit non-extended DSP instructions and 40-bit extended DSP instructions, and particularly shows the 20-bit shadow DSP sub-instruction of the single 40-bit extended shadow DSP instruction, according to one embodiment of the invention.

FIG. 6J illustrates additional control instructions for the ISA according to one embodiment of the present invention.

Figure 6K:
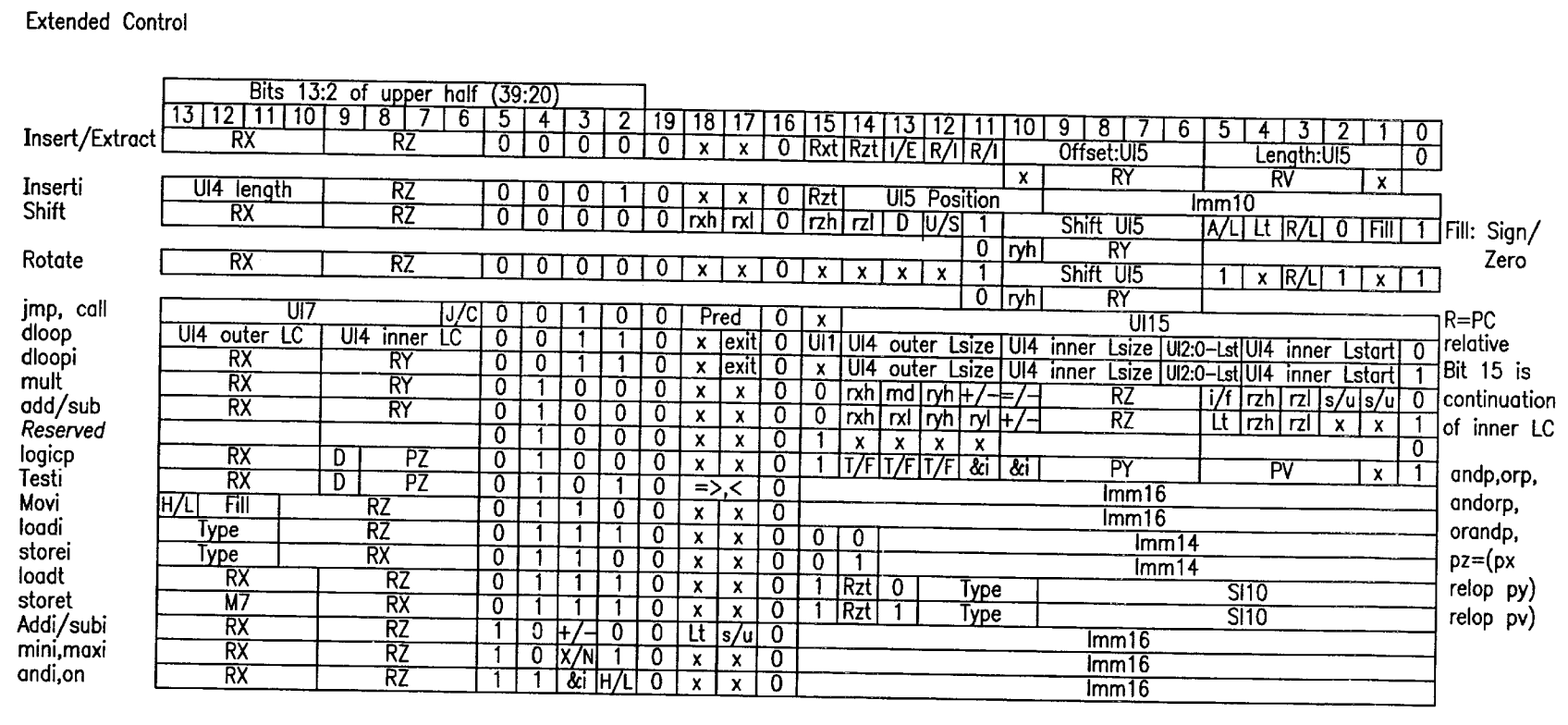

FIG. 6K lists a set of extended control instructions for the ISA according to one embodiment of the present invention.

Figure 6L:
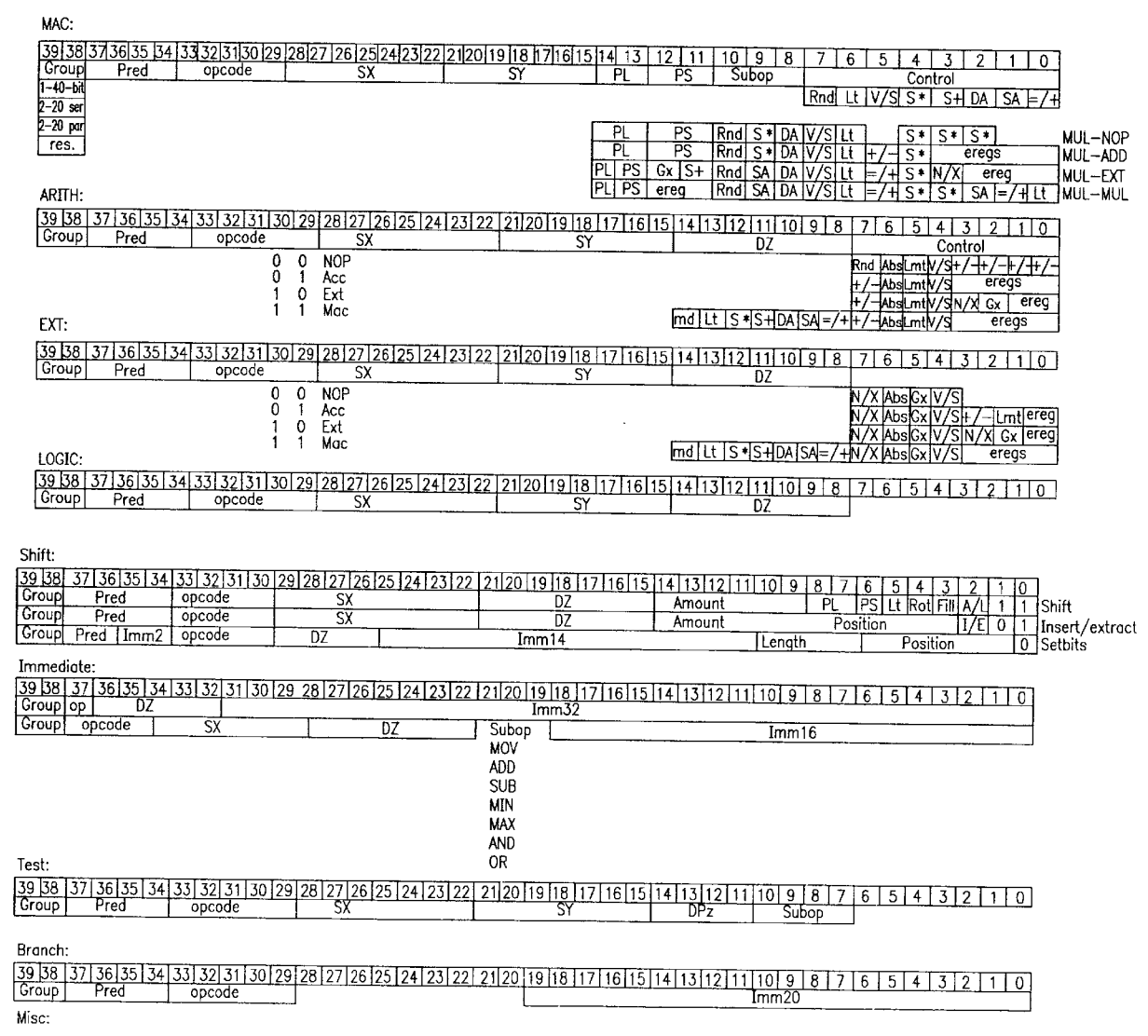

FIG. 6L lists a set of 40-bit DSP instructions for the ISA according to one embodiment of the present invention.

Figure 7:
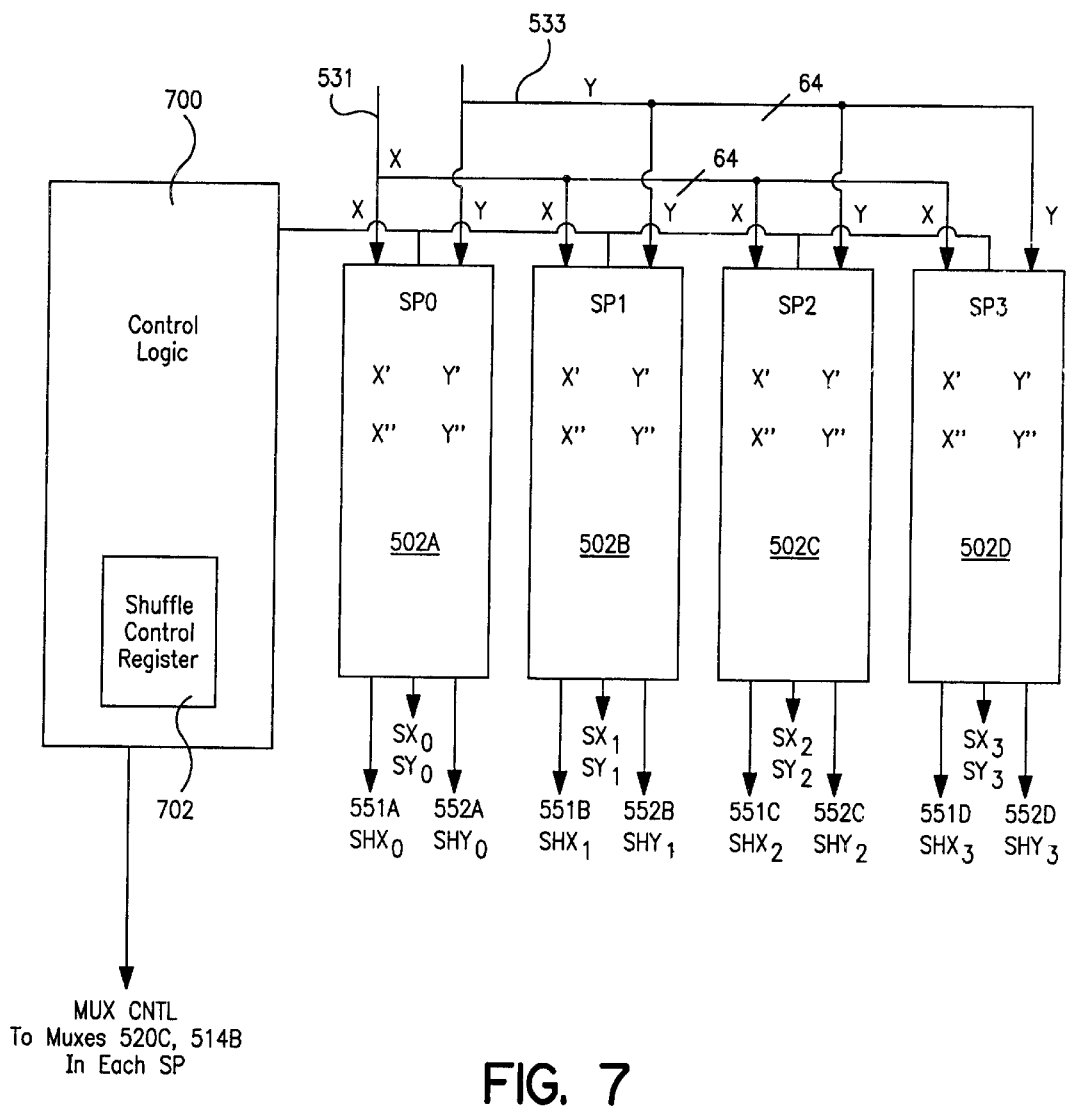

FIG. 7 is a block diagram illustrating an architecture to implement the Shadow DSP instruction according to one embodiment of the present invention.

FIG. 8A illustrates delayed data values x', x", y' and y" used in implementing the Shadow DSP instruction according to one embodiment of the present invention.

FIG. 8B illustrates primary stage computations and shadow stage computations performed by signal processor units (SPs) in implementing a finite impulse response (FIR) filter according to one embodiment of the present invention.

FIG. 8C illustrates a shuffle control register according to one embodiment of the present invention.

Figure 9A:
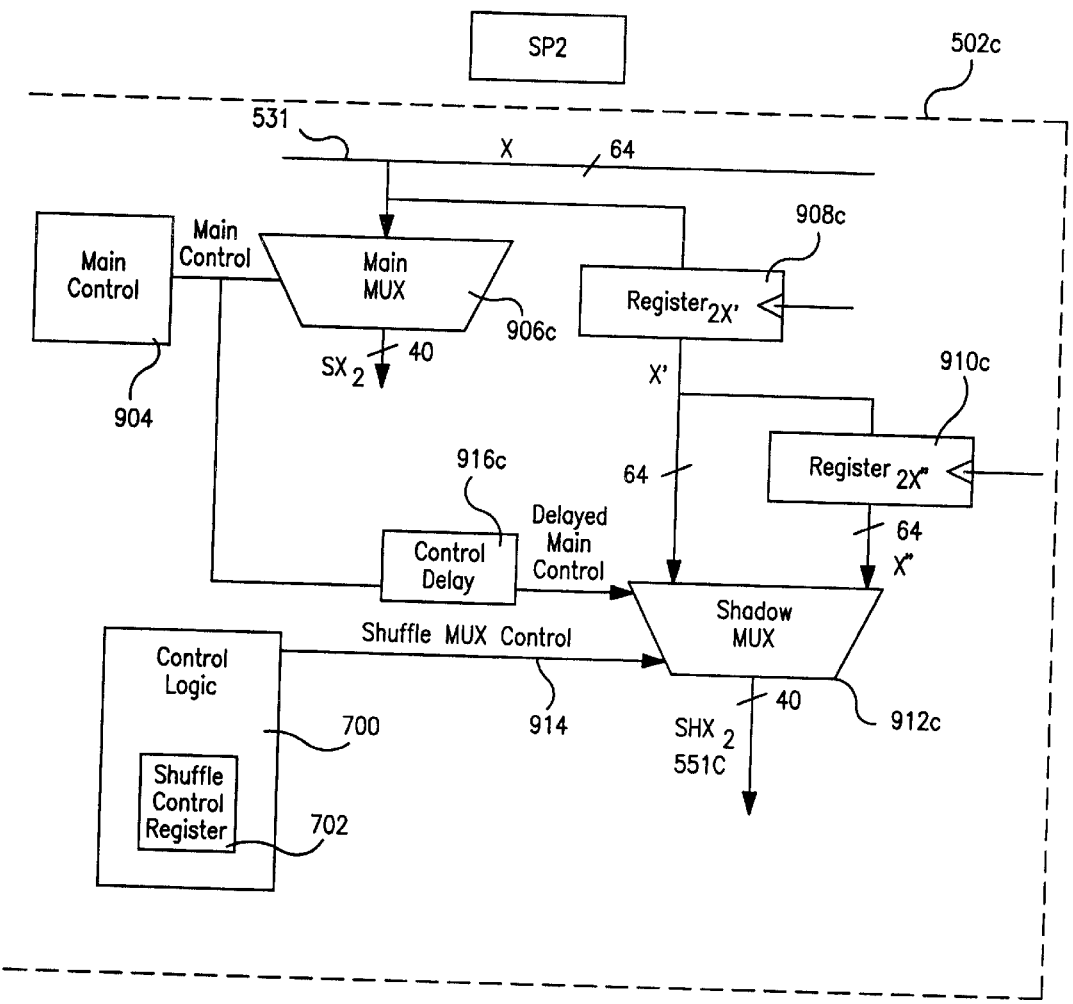

FIG. 9a illustrates the architecture of a data typer and aligner (DTAB) of a signal processing unit (SP2) to select current data for a primary stage and delayed data for use by a shadow stage from the x bus according to one embodiment of the present invention.

Figure 9B:
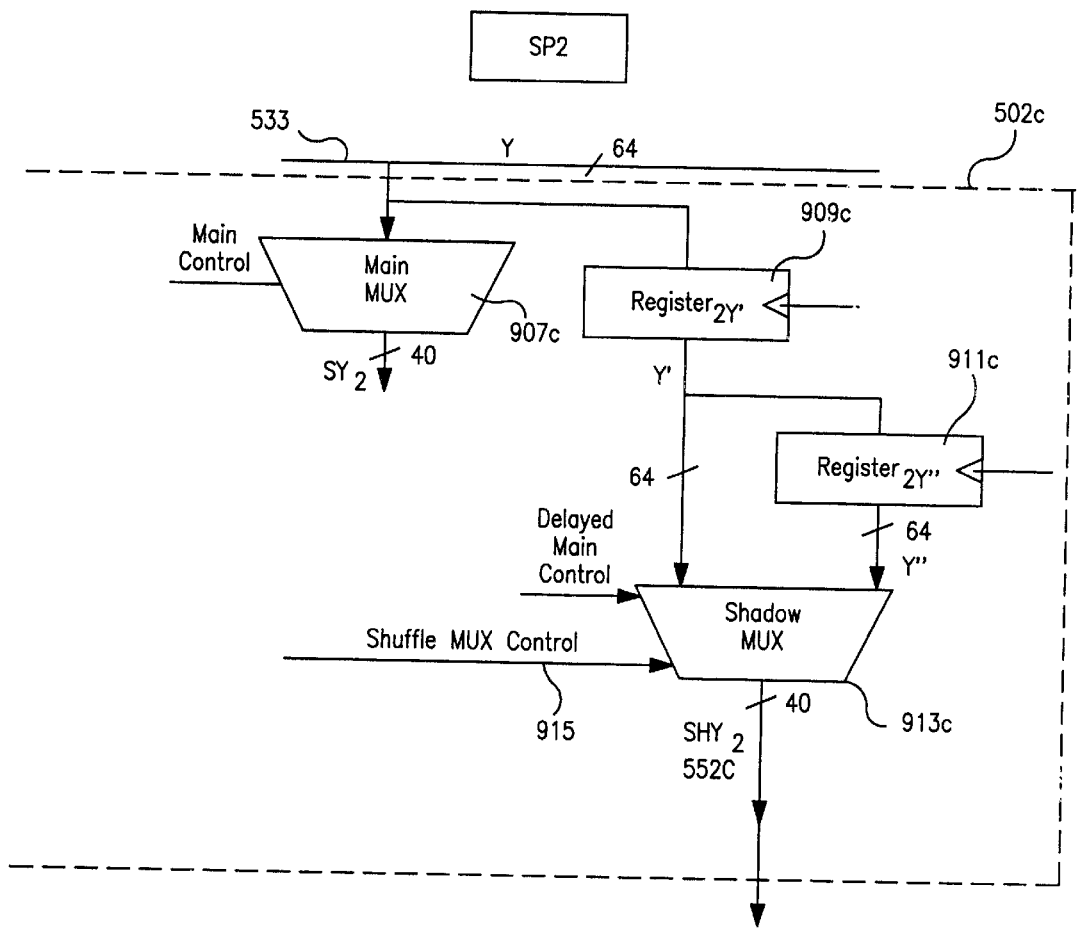

FIG. 9b illustrates the architecture of a data typer and aligner (DTAB) of a signal processing unit (SP2) to select current data for a primary stage and delayed data for use by a shadow stage from the y bus according to one embodiment of the present invention.

FIGS. 10a–10d illustrate the architecture of each shadow multiplexer of each DTAB for each signal processing unit (SP0, SP1, SP2, and SP3), respectively, according to one embodiment of the present invention.

Figure 11:
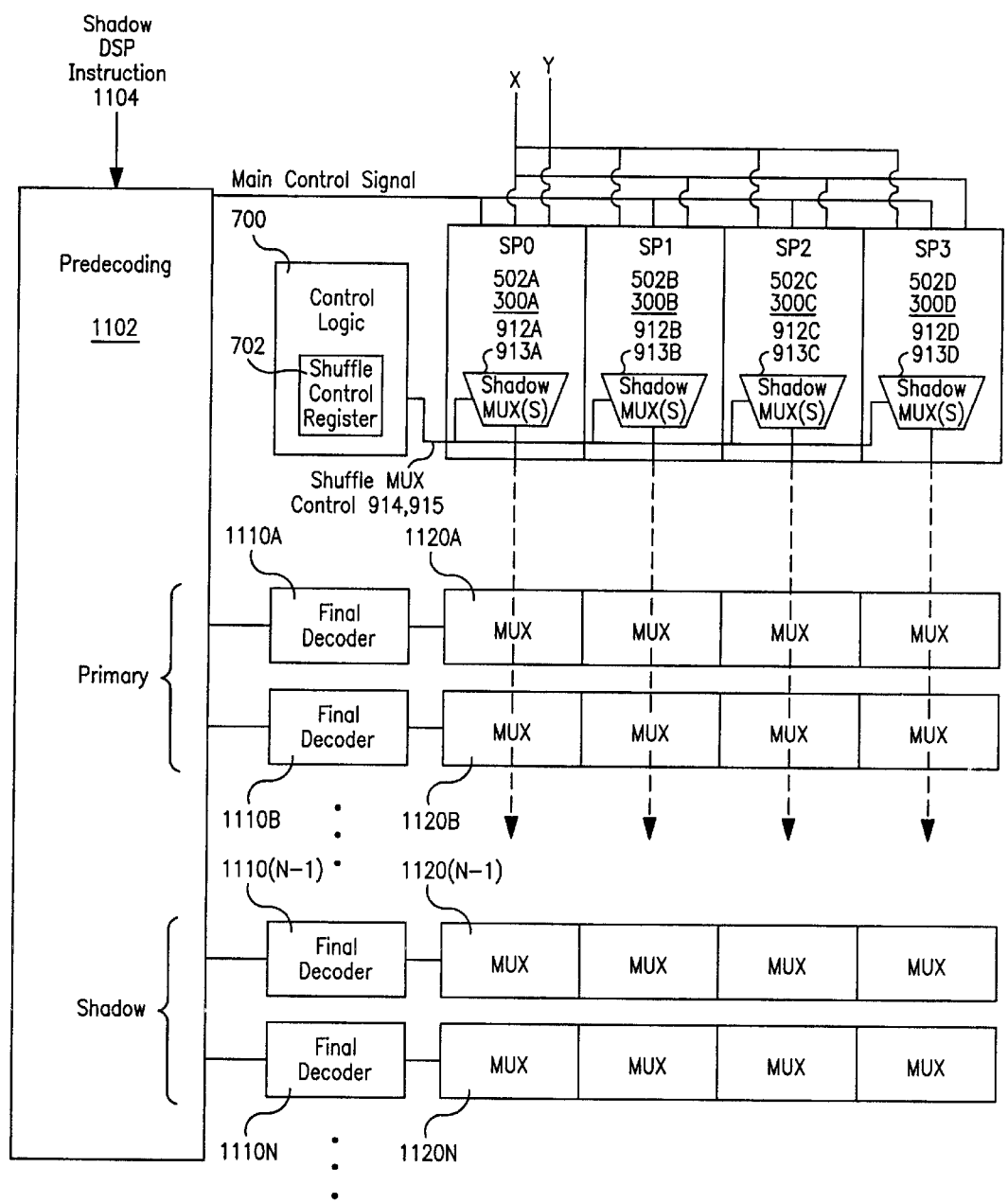

FIG. 11 is a block diagram illustrating the instruction decoding for configuring the blocks of the signal processing units according to one embodiment of the present invention.

Like reference numbers and designations in the drawings indicate like elements providing similar functionality. A letter after a reference designator number represents an instance of an element having the reference designator number.

DETAILED DESCRIPTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention. Furthermore, the present invention will be described in particular embodiments but may be implemented in hardware, software, firmware or a combination thereof.

Multiple Application Specific Signal Processors (ASSPs) having the instruction set architecture of the present invention are provided within gateways in communication systems to provide improved voice and data communication over a packetized network. Each ASSP includes a serial interface, a buffer memory and multiple core processors in order to simultaneously process multiple channels of voice or data. Each core processor preferably includes at least one reduced instruction set computer (RISC) processor and multiple signal processing units (SPs). Each SP includes multiple arithmetic blocks to simultaneously process multiple voice and data communication signal samples for communication over IP, ATM, Frame Relay, or other packetized network. The multiple signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units. The RISC ISA is a register based architecture including 16-registers within the register file, while the DSP ISA is a memory based architecture with efficient digital signal processing instructions.

The instruction word for the ASSP can be 20 bits, or can be expanded to 40 bits. The 40-bit instruction word can be used to control two instructions to be executed in series or parallel, such as two RISC control instructions, extended DSP instructions, or two 20-bit DSP instructions. The instruction set architecture of the ASSP has five distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, (4) a 40-bit DSP instruction that extends the capabilities of a 20-bit dyadic DSP instruction by providing powerful bit manipulation, and 5) a single 40-bit extended shadow DSP instruction that includes a pair of 20-bit dyadic sub-instructions: a primary DSP sub-instruction and a shadow DSP sub-instruction that are executed simultaneously according to one embodiment of the present invention.

These instructions are for accelerating calculations within the core processor of the type where D=[(A op1 B) op2 C] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor.

In one embodiment of the present invention, a single extended shadow DSP instruction includes a pair of sub-instructions: a primary DSP sub-instruction and a shadow DSP sub-instruction. Both the primary and the shadow DSP sub-instructions are dyadic DSP instructions performing two operations in one instruction cycle. These DSP operations include the MULT, ADD, MIN/MAX, and NOP operations as previously described.

According to one embodiment, each core processor has a plurality of signal processing units (SPs). Each of the SPs includes a primary stage to execute a primary DSP sub-instruction based upon current data and a shadow stage to simultaneously execute a shadow DSP sub-instruction based upon delayed data stored locally within delayed data registers of each SP. Each SP includes a shadow selector coupled to the delayed data registers of its own associated SP. Control logic is utilized to control the shadow selectors of each SP to select delayed data (specified by the shadow DSP sub-instruction) from the delayed data registers for use by the shadows stages of the In this way, the present invention efficiently executes DSP instructions by simultaneously executing primary DSP sub-instructions (based upon current data) and shadow DSP sub-instructions (based upon delayed locally stored data) with a single DSP instruction thereby performing four operations per single instruction cycle per SP.

Figure 1A:
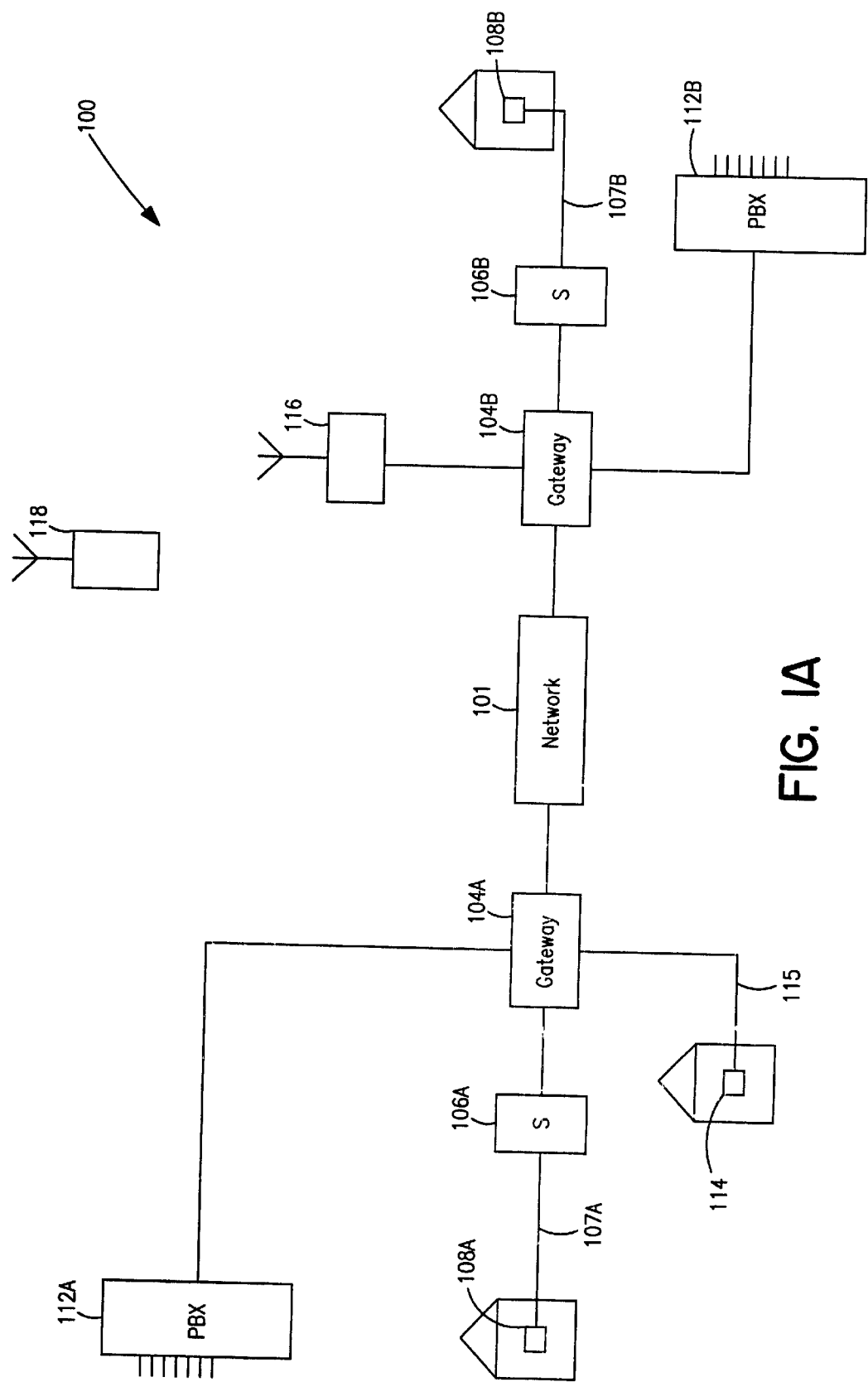
FIG. 1A is a block diagram of a system utilizing the present invention.

Referring now to FIG. 1A, a voice and data communication system 100 is illustrated. The system 100 includes a network 101 that is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101.

The system 100 includes gateways 104A and 104B in order to packetize the information received for transmission across the network 101. A gateway is a device for connecting multiple networks and devices that use different protocols. Voice and data information may be provided to a gateway 104 from a number of different sources in a variety of digital formats.

In system 100, analog voice signals are transceived by a telephone 108 over the plain old telephone system (POTS) 107A and are coupled into a switch 106A of the public switched telephone network (PSTN). At the switch 106A, the analog signals from the POTS 107A are digitized and transceived to the gateway 104A by time division multiplexing (TDM) with each time slot representing a channel and one DS0 input to gateway 104A.

In system 100, digital voice signals are transceived at public branch exchanges (PBX) 112A and 112B that are coupled to multiple telephones, fax machines, or data modems. Digital voice signals are transceived between PBX 112A and PBX 112B with gateways 104A and 104B, respectively. Digital data signals may also be transceived directly between a digital modem 114 and a gateway 104A. Digital modem 114 may be a Digital Subscriber Line (DSL) modem or a cable modem.

Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B.

Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DS0 input to gateway 104B.

At each of the gateways 104A and 104B incoming signals are packetized for transmission across the network 101. Signals received by the gateways 104A and 104B from the network 101 are depacketized and transcoded for distribution to the appropriate destination.

Figure 1B:
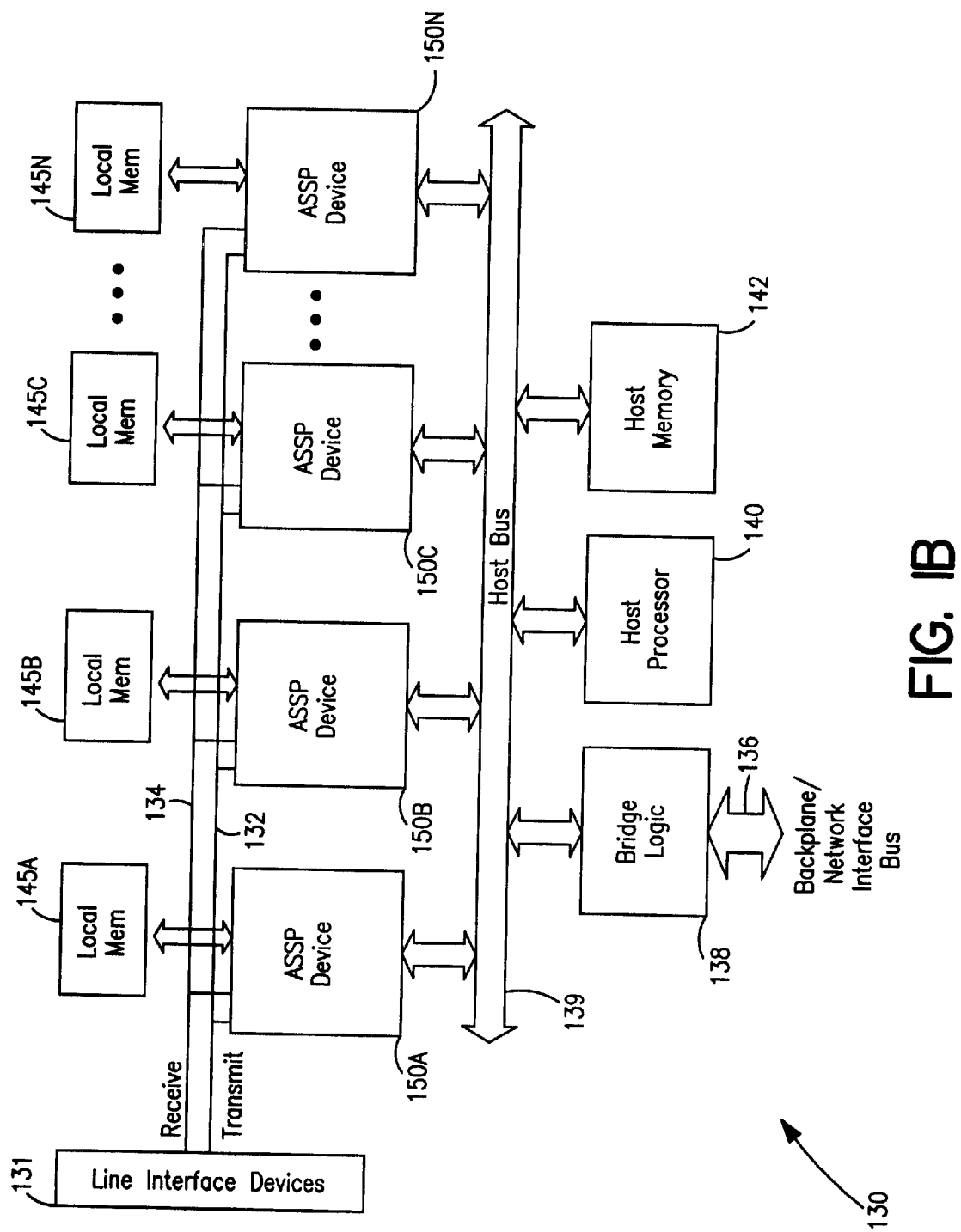
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 1S0N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
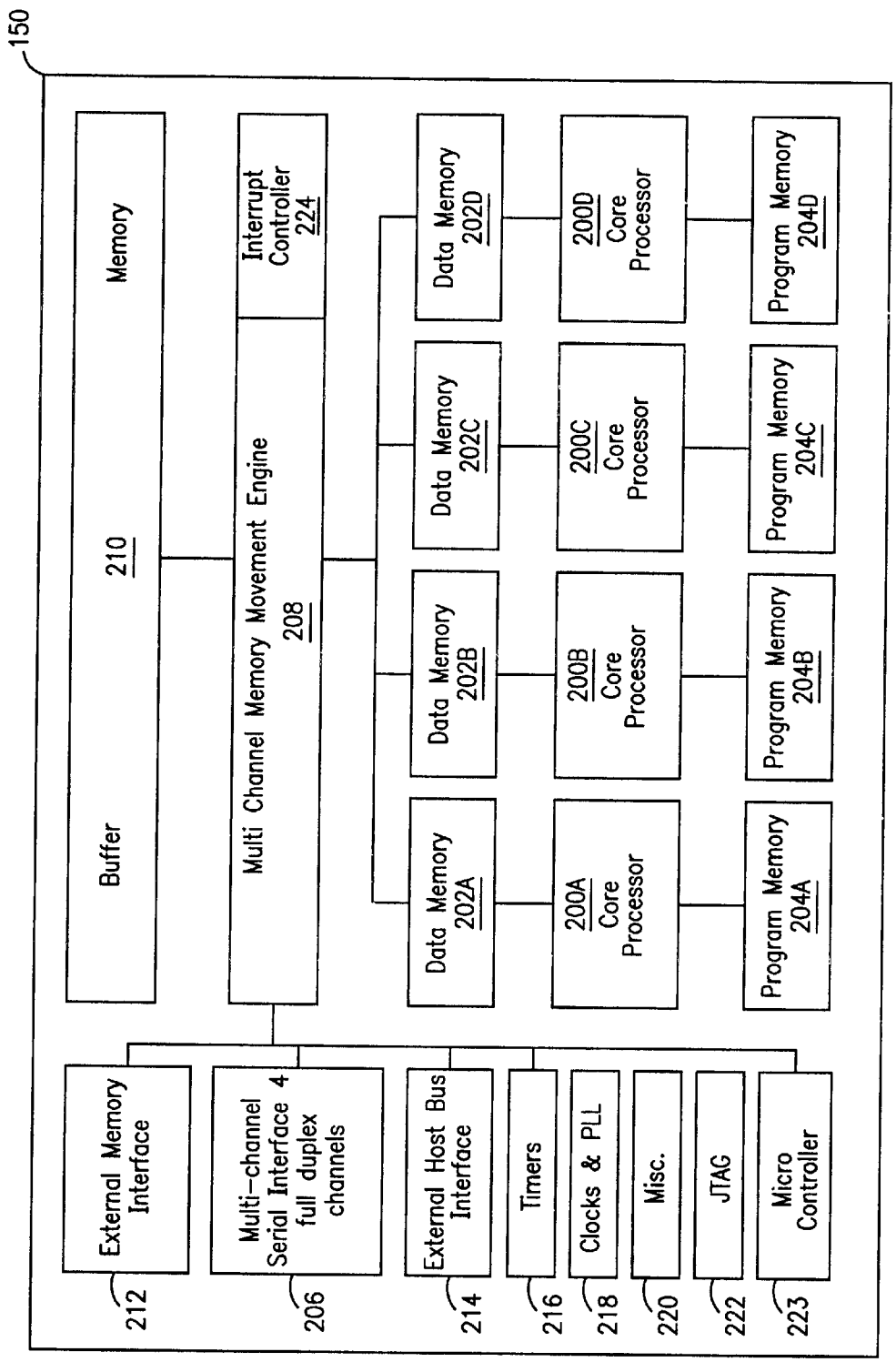
FIG. 2 is a block diagram of an Application Specific Signal Processor (ASSP) according to one embodiment of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B. Further included within the ASSP 150 are timers 216, clock generators and a phase-lock loop 218, miscellaneous control logic 220, and a Joint Test Action Group (JTAG) test access port 222 for boundary scan testing. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Figure 3:
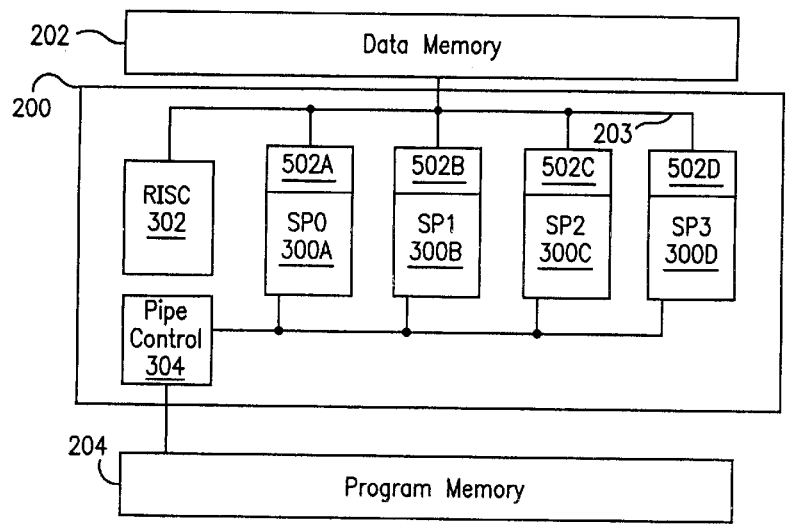
FIG. 3 is a block diagram of an instance of one of the core processors according to one embodiment of the present invention within an ASSP.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level. Further, the signal processing units 300A–300D are each connected to data memory 202, to each other, and to the RISC 302, via data bus 203, for the exchange of data (e.g. operands).

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory, resulting in very efficient data processing. Thus, the instruction set architecture of the present invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 4:
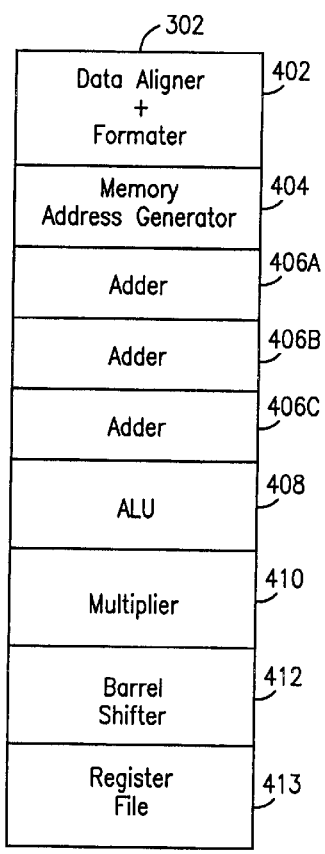
FIG. 4 is a block diagram of the RISC processing unit within the core processors of FIG. 3.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Figure 5A:
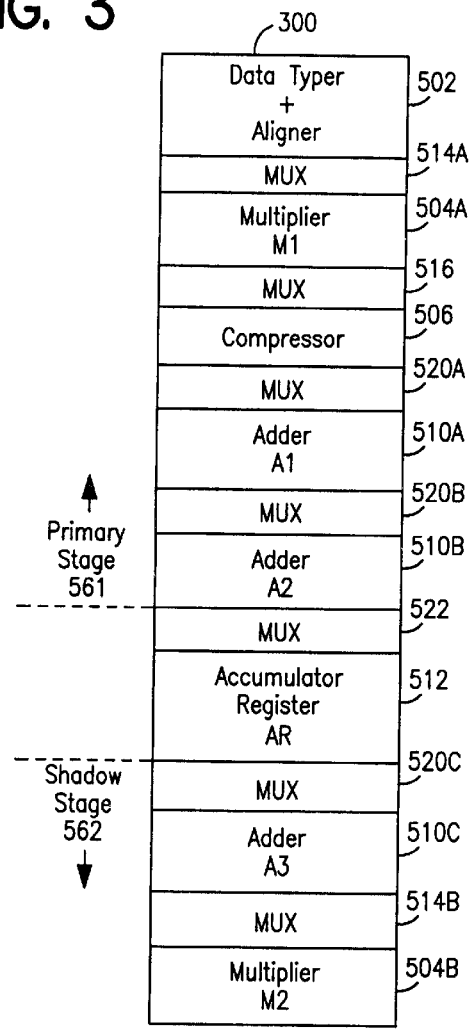
FIG. 5A is a block diagram of an instance of a signal processing unit (SP) according to one embodiment of the present invention within a core processor of FIG. 3.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504D. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers.

In one embodiment, the signal processing unit 300 has a primary stage 561, located above multiplexer 522 and accumulator 512, to execute a primary DSP sub-instruction based upon current data and a shadow stage 562, located below multiplexer 522 and accumulator 512, to simultaneously execute a shadow DSP sub-instruction based upon delayed data stored locally within delayed data registers of the data typer and aligner 502. The delayed data registers will be discussed in detail later. As previously discussed, a single 40-bit extended shadow DSP instruction according to one embodiment of the present invention includes a 20-bit dyadic primary DSP sub-instruction and a 20-bit dyadic shadow DSP sub-instruction.

In this embodiment, multiplier M1 504A, compressor 506, adder A1 510A, and adder A2 510B, of the primary stage 561, and accumulator 512, typically receive inputs directly from the external data bus 203 through the data typer and aligner 502. Adder 510C and multiplier M2 504B, of the shadow stage 562, typically receive inputs from the delayed data registers of the data typer and aligner 502 or the accumulator 512.

Program memory 204 couples to the pipe control 304 that includes an instruction buffer that acts as a local loop cache. The instruction buffer in the preferred embodiment has the capability of holding four instructions, such as, four single 40-bit extended shadow DSP instructions each having a 20-bit dyadic primary sub-instruction and a 20-bit dyadic shadow DSP sub-instruction. The instruction buffer of the pipe control 304 reduces the power consumed in accessing the main memories to fetch instructions during the execution of program loops.

Figure 5B:
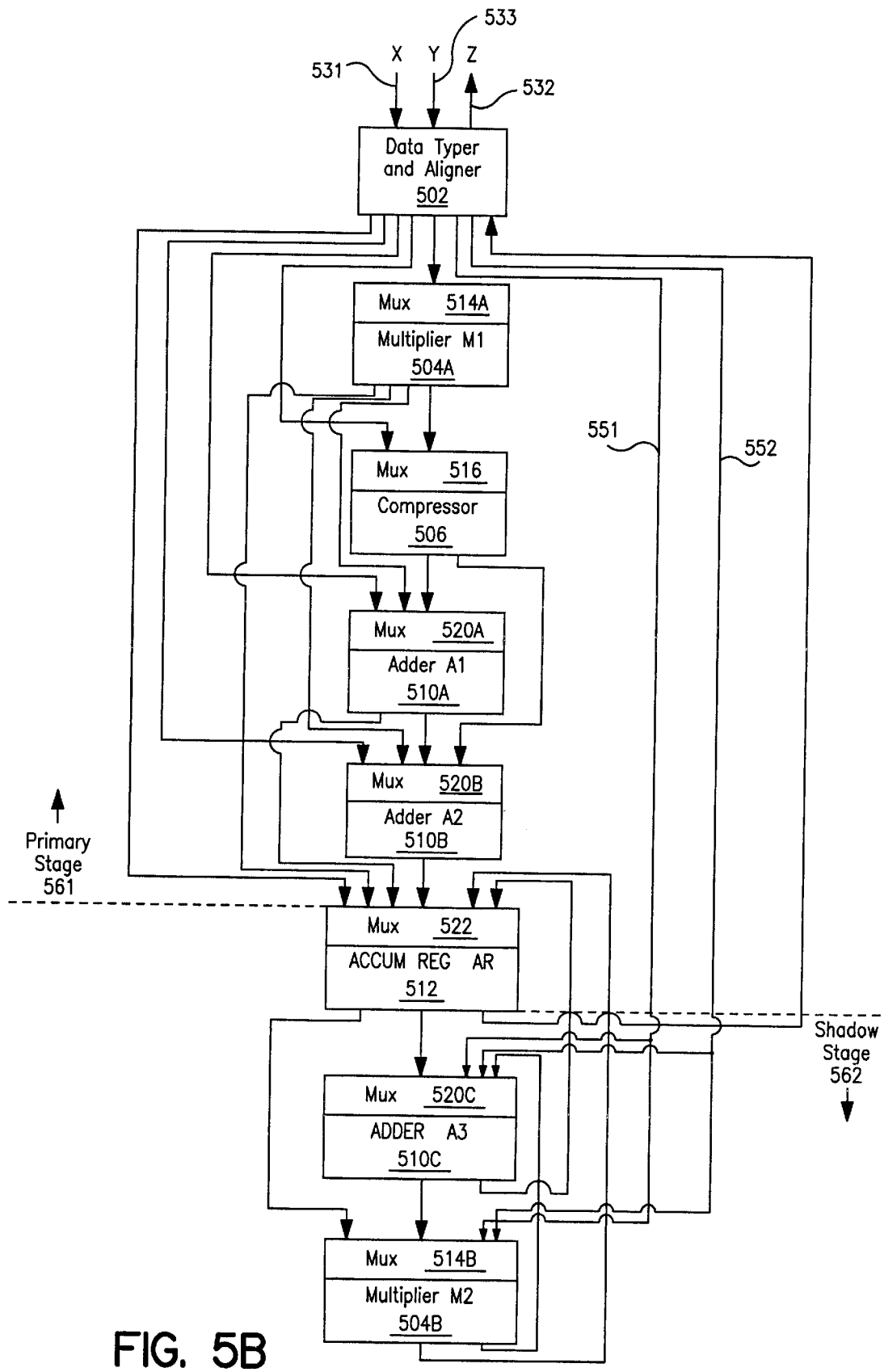
FIG. 5B is a more detailed block diagram of FIG. 5A illustrating the bus structure of the signal processing unit according to one embodiment of the present invention.

Referring now to FIG. 5B, a more detailed block diagram of the functional blocks and the bus structure of the signal processing unit 300 is illustrated. Dyadic DSP instructions are possible because of the structure and functionality provided in each signal processing unit. Particularly, the structure and functionality provided in each signal processing unit allow a 20-bit dyadic primary DSP sub-instruction and a 20-bit dyadic shadow DSP sub-instruction, of a single 40-bit extended shadow DSP instruction, to be executed simultaneously.

Output signals are coupled out of the signal processor 300 on the Z output bus 532 through the data typer and aligner 502. Input signals are coupled into the signal processor 300 on the X input bus 531 and Y input bus 533 through the data typer and aligner 502. Internally, the data typer and aligner 502 has a different data bus to couple to each of multiplier M1 504A, compressor 506, adder A1 510A, adder A2 510B, and accumulator register AR 512 of the primary stage 561. The data typer and aligner 502 also has two different data busses 551 and 552 each of which couple to each of adder A3 510C and multiplier M2 504B of the shadow stage 562. Typically data busses 551 and 552 deliver inputs from the delayed data registers of the data typer and aligner 502 to adder A3 510C and multiplier M2 504B. Also, output data is coupled from the accumulator register AR 512 into the data typer and aligner 502.

Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512. Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

Instruction Set Architecture

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the present invention to DSP algorithmic structures is a balance between ease of implementation, processing efficiency, and programmability of DSP algorithms. The ISA of the present invention provides for data movement operations, DSP/arithmetic/logical operations, program control operations (such as function calls/returns, unconditional/conditional jumps and branches), and system operations (such as privilege, interrupt/trap/hazard handling and memory management control).

Referring now to FIG. 6A, an exemplary instruction sequence 600 is illustrated for a DSP algorithm program model employing the instruction set architecture of the present invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions that are typically infrequently executed. Instructions 604 are typically to provide the setup for the inner loop 602, other control through 2×20 control instructions, dual loop setup, offset extensions for pointer backup, or a loop shadow for shadow signal processing units (e.g. the functional units of the shadow stage) in order to reduce outer loop iterations. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing units 300 in a single instruction multiple data execution mode, memory access for operands, dyadic DSP operations, and other DSP functionality through the 20/40 bit DSP instructions of the ISA of the present invention. Because instructions 605 are so often repeated, significant improvement in operational efficiency may be had by providing the DSP instructions, including general dyadic instructions and dyadic DSP instructions, within the ISA of the present invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC or DSP instructions to be executed in series or parallel, such as a RISC control instruction executed in parallel with a DSP instruction, or a 40 bit extended RISC or DSP instruction.

The instruction set architecture of the ASSP has five distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, (4) a 40-bit DSP instruction that extends the capabilities of a 20-bit dyadic DSP instruction by providing powerful bit manipulation, and 5) a single 40-bit extended shadow DSP instruction that includes a pair of 20-bit dyadic sub-instructions: a primary DSP sub-instruction and a shadow DSP sub-instruction that are executed simultaneously according to one embodiment of the present invention.

These instructions are for accelerating calculations within the core processor 200 of the type where D=[(A op1 B) op2 C] and each of "op1" and "op2" can be a multiply, add or extremum (min/max) class of operation on the three operands A, B, and C. The ISA of the ASSP 150 that accelerates these calculations allows efficient chaining of different combinations of operations. Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bits 39 and 19 indicating the type of instruction. After fetching, the instruction is grouped into two sections of 20 bits each for execution of operations. Referring to FIG. 6B, in the case of 20-bit control instructions with parallel execution (bit 39=0, bit 19=0), the two 20-bit sections are control instructions that are executed simultaneously. In the case of 20-bit control instructions for serial execution (bit 39=0, bit 19=1), the two 20-bit sections are control instructions that are executed serially. In the case of 20-bit DSP instructions for serial execution (bit 39=1, bit 19=1), the two 20-bit sections are DSP instructions that are executed serially.

In the case of 40-bit extended DSP instructions (bit 39=1, bit 19=0), the two 20 bit sections form one extended DSP instruction and are executed simultaneously. This 40-bit DSP instruction has two flavors: 1) Extended: a 40-bit DSP instruction that extends the capabilities of a 20-bit dyadic DSP instruction—the first 20 bit section is a DSP instruction and the second 20-bit section extends the capabilites of the first DSP instruction and provides powerful bit manipulation instructions, i.e., it is a 40-bit DSP instruction that operates on the top row of functional unit (i.e. the primary stage 561) with extended capabilities; and 2) Shadow: a single 40-bit DSP instruction that includes a pair of 20-bit dyadic sub-instructions: a primary DSP sub-instruction and a shadow DSP sub-instruction that are executed simultaneously, in which, the first 20-bit section is a dyadic DSP instruction that executes on the top row of functional units (i.e. the primary stage 561), while the second 20-bit section is also a dyadic DSP instruction that executes on the bottom row of functional units (i.e. the shadow stage 562) according to one embodiment of the present invention. In a preferred embodiment, the distinction between the "Extended" and "Shadow" flavor is made by bit 5 of the 40-bit DSP instruction being set to "0" for "Extended" and to "1" for "Shadow."

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands, within the data memory 202, the registers within the accumulator 512, the register file 413 of the RISC 302, or the delayed registers of the data typer and aligner 502 of the signal processing units 300, a 6-bit specifier is used in the DSP extended instructions to access operands in memory and registers. FIG. 6C shows an exemplary 6-bit operand specifier according to one embodiment of the present invention. Of the six bit specifier used in the extended DSP instructions, the MSB (Bit 5) indicates whether the access is a memory access or register access. In this embodiment, if Bit 5 is set to logical one, it denotes a memory access for an operand. If Bit 5 is set to a logical zero, it denotes a register access for an operand.

If Bit 5 is set to 1, the contents of a specified register (rX where X: 0–7) are used to obtain the effective memory address and post-modify the pointer field by one of two possible offsets specified in one of the specified rX registers. FIG. 6D shows an exemplary memory address register according to one embodiment of the present invention.

If Bit 5 is set to 0, Bit 4 determines what register set has the contents of the desired operand. If Bit-4 is set to 1, the remaining specified bits control access to the general purpose file (r0–r15) within the register file 413. If Bit-4 is set to 0, then the remaining specified bits 3:0 control access to the general purpose register file (r0–r15) within the register file 413, the accumulator registers 512 of the signal processing units 300, or the delayed data registers of the data typer and aligners 502 of the signal processing units 300. The general purpose file (GPR) holds data or memory addresses to allow RISC or DSP operand access. RISC instructions in general access only the GPR file. DSP instructions access memory using GPR as addresses.

FIG. 6E shows an exemplary 3-bit specifier for operands for use by shadow DSP instructions only. It should be noted that in one exemplary embodiment, each accumulator register 512 of each signal processing unit 300 includes registers: A0, A1, T, and TR as referenced in FIGS. 6C and 6E. The registers A0 and A1 can be used to hold the result of multiply and arithmetic operations. The T register can be used for holding temporary data and in min-max searches like trellis decoding algorithms. The TR registers records which data value gave rise to the maximum (or minimum). When the values SX1, SX2, SY1, and SY2 are specified in the ereg fields, control logic simply selects the specified delayed data for the shadow stages of each SP without shuffling. When the values SX1s, SX2s, SY1s, SY2s are specified in the ereg fields, these values designate controls specified in a shuffle control register that determine how control logic will control shadow selectors within the data typer and aligners (DTABs) 502 of each of the signal processing units (SPs) 300 to pick delayed data held in delayed data registers for use by shadow stages of the SPs as will be discussed in greater detail later.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently.

FIG. 6F illustrates an exemplary 5-bit operand specifier according to one embodiment of the invention that includes the 4-bit specifier for general data operands and special purpose registers (SPR). The 5-bit operand specifier is used in RISC instructions.

It should be noted that the preceding bit maps for operand specifiers to access registers and memory illustrated in FIGS. 6B–6F are only exemplary, and as should be appreciated by one skilled in the art, any number of bit map schemes, register schemes, etc., could be used to implement the present invention.

DSP Instructions

There are four major classes of DSP instructions for the ASSP 150 these are:

1) Multiply (MULT): Controls the execution of the main multiplier connected to data buses from memory.
   Controls: Rounding, sign of multiply operates on vector data specified through type field in address register
   Second operation: Add, Sub, Min, Max in vector or scalar mode
2) Add (ADD): Controls the execution of the main-adder
   Controls: absolute value control of the inputs, limiting the result
   Second operation: Add, add-sub, mult, mac, min, max
3) Extremum (MIN/MAX): Controls the execution of the main-adder
   Controls: absolute value control of the inputs, Global or running max/min with T register, TR register recording control
   Second operation: add, sub, mult, mac, min, max
4) Misc: type-match and permute operations.

All of the DSP instructions control the multipliers 504A–504B, adders 510A–510C, compressor 506 and the accumulator 512, the functional units of each signal processing unit 300A–300D. The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

Dyadic DSP Instruction

All DSP instructions of the instruction set architecture of the ASSP 150 are dyadic DSP instructions within the 20-bit or 40-bit instruction word. A dyadic DSP instruction informs the ASSP in one instruction and one cycle to perform two operations.

FIG. 6G is a chart illustrating the permutations of the dyadic DSP instructions. The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the present invention can be generalized to combining any pair of basic DSP operations to provide very powerful dyadic instruction combinations. Compound DSP operational instructions can provide uniform acceleration for a wide variety of DSP algorithms not just multiply-accumulate intensive filters.

The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

40-Bit Extended Instruction Word: Extended/Shadow

In the 40 bit instruction word, the type of extension from the 20 bit instruction word falls into five categories:

1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers
5) Shadow DSP extensions that control the shadow stage 562 (i.e. the lower rows of functional units) within a signal processing unit 300 to accelerate block processing.

In the case of a 40-bit extended DSP instruction words (bit 39=1, bit 19=0), execution is based on the value of Bit 5 (0=Extended/1=Shadow). If an extended instruction is set by the value of bit 5, the first 20-bit section is a DSP instruction and the second 20-bit section extends the capabilities of the first DSP instruction, i.e., it is a 40-bit DSP instruction that executes on the top row of functional DSP units within the signal processing units 300. The 40-bit control instructions with the 20 bit extensions allow a large immediate value (16 to 20 bits) to be specified in the instruction and powerful bit manipulation instructions.

If a shadow instruction is set by the value of bit 5, the first 20-bit section is a dyadic DSP instruction that executes on the top row of functional units (the primary stage), while the second 20-bit section is another dyadic DSP instruction that executes on the second row of functional units (the shadow stage).

Efficient DSP execution is provided with the single 40-bit Shadow DSP instruction that includes a pair of 20-bit dyadic sub-instructions: a primary dyadic DSP sub-instruction and a shadow dyadic DSP sub-instruction. Since both the primary and the DSP sub-instruction are dyadic they each perform two DSP operations in one instruction cycle. These DSP operations include the MULT, ADD, MIN/MAX, and NOP operations as previously described. Referring again to FIG. 5B, the first 20 bits, i.e. the primary dyadic DSP sub-instruction, controls the primary stage 561 of signal processing unit 300, which includes the top functional units (adders 510A and 510B, multiplier 504A, compressor 506), that interface to data busses 203 (e.g. x bus 531 and y bus 533) from memory, based upon current data.

The second 20 bits, i.e. the shadow dyadic DSP sub-instruction, controls the shadow stage 562, which includes the bottom functional units (adder 510C and multiplier 504B), simultaneously with the primary stage 561. The shadow stage 562 uses internal or local data as operands such as delayed data stored locally within delayed data registers of each signal processing unit or data from the accumulator.

The top functional units of the primary stage 561 reduce the inner loop cycles in the inner loop 602 by parallelizing across consecutive taps or sections. The bottom functional units of the shadow stage 562 cut the outer loop cycles in the outer loop 601 in half by parallelizing block DSP algorithms across consecutive samples. Further, the present invention efficiently executes DSP instructions utilizing the 40-bit Shadow DSP instruction to simultaneously execute the primary DSP sub-instructions (based upon current data) and shadow DSP sub-instructions (based upon delayed locally stored data) thereby performing four operations per single instruction cycle per signal processing unit.

Efficient DSP execution is also improved by the hardware architecture of the present invention. In this case, efficiency is improved in the manner that data is supplied to and from data memory 202 to feed the four signal processing units 300 and the DSP functional units therein. The data bus 203 is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data. In the preferred embodiment, when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

As previously described, in one embodiment of the present invention, a single 40-bit Shadow DSP instruction includes a pair of 20-bit dyadic sub-instructions: a primary dyadic DSP sub-instruction and a shadow dyadic DSP sub-instruction. Since both the primary and the DSP sub-instruction are dyadic they each perform two DSP operations in one instruction cycle. These DSP operations include the MULT, ADD, MIN/MAX, and NOP operations as previously described. The first 20-bit section is a dyadic DSP instruction that executes on the top row of functional units (i.e. the primary stage 561) based upon current data, while the second 20-bit section is also a dyadic DSP instruction that executes, simultaneously, on the bottom row of functional units (i.e. the shadow stage 562) based upon delayed data locally stored within the delayed data registers of the signal processing units or from the accumulator. In this way, the present invention efficiently executes DSP instructions by simultaneously executing primary and shadow DSP sub-instructions with a single 40-bit Shadow DSP instruction thereby performing four operations per single instruction cycle per SP.

The Shadow DSP Instruction

Referring now to FIGS. 6H and 6I, bitmap syntax for exemplary 20-bit non-extended and 40-bit extended DSP instructions is illustrated. As previously discussed, for the 20-bit non-extended instruction word the bitmap syntax is the twenty most significant bits of a forty bit word while for 40-bit extended DSP instruction the bitmap syntax is an instruction word of forty bits. Particularly, FIGS. 6H and 6I taken together illustrate an exemplary 40-bit Shadow DSP instruction. FIG. 6H illustrates bitmap syntax for a 20-bit DSP instruction, and more particularly, the first 20-bit section of the primary dyadic DSP sub-instruction. FIG. 6I illustrates the bitmap syntax for the second 20-bit section of a 40-bit extended DSP instruction and more particularly, under "Shadow DSP", illustrates the bitmap syntax for the shadow dyadic DSP sub-instruction. Note that for the 40-bit shadow instruction to be specified bit 39=1, bit 19=0, and bit 5=1.

As shown in FIG. 6H, the three most significant bits (MSBs), bits numbered 37 through 39, of the primary dyadic DSP sub-instruction (i.e. the first 20-bit section) indicates the MAIN OP instruction type while the SUB OP is located near the end of the primary dyadic DSP sub-instruction at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected. In the case of MULT as the MAIN OP, the SUB OPs are 000 for NOP, 001 or 010 for ADD, 100 or 011 for a negative ADD or subtraction, 101 or 110 for MIN, and 111 for MAX. The bitmap syntax for other MAIN OPs and SUB OPs can be seen in FIG. 6H.

As shown in FIG. 6I, under "Control and specifier Extensions", the lower twenty bits of the control extended dyadic DSP instruction, i.e. the extended bits, control the signal processing unit to perform rounding, limiting, absolute value of inputs for SUB OP, or a global MIN/MAX operation with a register value.

Particularly, as shown in FIG. 6I under "Shadow DSP", instruction bits numbered 14, 17, and 18, of the shadow dyadic DSP sub-instruction indicate the MAIN OP instruction type while the SUB OP is located near the end of the shadow dyadic DSP sub-instruction at bits numbered 0 through 2. In one embodiment, the MAIN OP instruction codes and the SUB OP codes can be the same as previously described for the primary dyadic DSP sub-instruction. However, it will be appreciated by those skilled in the art that the instruction bit syntax for the MAIN OPs and the SUB OPs of the primary and shadow DSP sub-instructions of the Shadow DSP instruction are only exemplary and a wide variety of instruction bit syntaxes could be used. Further, FIG. 6I shows the ereg1 (bits 10–12) and ereg2 (bits 6–8) fields, which as previously discussed, are used for selecting the data values to be used by the shadow stages, as will be discussed in more detail later.

The bitmap syntax of the dyadic DSP instructions can be converted into text syntax for program coding. Using the multiplication or MULT as an example, its text syntax for multiplication or MULT is (vmul|vmuln).(vadd|vsub|vmax|sadd|ssub|smax) da, sx, sa, sy [,(ps0)|ps1)]

The "vmul|vmuln" field refers to either positive vector multiplication or negative vector multiplication being selected as the MAIN OP. The next field, "vadd|vsub|vmax|sadd|ssub|smax", refers to either vector add, vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[,(ps0) |ps1)]" refers to pair selection of keyword PS0 or PS1 specifying which are the source-destination pairs of a parallel-store control register.

FIG. 6J illustrates additional control instructions for the ISA according to one embodiment of the present invention. FIG. 6K illustrates a set of extended control instructions for the ISA according to one embodiment of the present invention. FIG. 6L illustrates a set of 40-bit DSP instructions for the ISA according to one embodiment of the present invention.

Architecture to Implement the Shadow DSP Instruction

Referring now to FIG. 7, an architecture to implement the single 40-bit extended shadow DSP instruction according to one embodiment of the present invention is illustrated. FIG. 7 shows a control logic block 700 having a shuffle control register 702 coupled to the data typer and aligner blocks 502A, 502B, 502C, and 502D of each of the Signal Processors (SPs) SP0, SP1, SP2, and SP3, respectively, of a core processor 200 (FIG. 3). The control logic block 700 is also coupled to the multiplexers 520C and 514B of the shadow stage 562 of each SP (FIG. 5B).

The x input bus 531 and y input bus 533 are coupled to the data typer and aligner blocks (DTABs) 502A, 502B, 502C, and 502D of each of the Signal Processors SP0, SP1, SP2, and SP3, respectively. Each DTAB provides x and y data values to the functional blocks (e.g. multiplier M1 504A, compressor 506, adder A1 510A, and adder A2 510B of FIG. 5B) of its respective primary stage. Also, each DTAB of each SP stores delayed data values of the x and y busses: x', x'', y', and y'' in delayed data registers to provide outputs to the functional blocks (e.g. adder A3 510C and multiplier M2 504B) of its respective shadow stage 562 via data busses 551 and 552 (FIG. 5B).

Referring briefly to FIG. 8A, x'=[$SX_{10}, SX_{11}, SX_{12}, SX_{13}$] and x''=[$SX_{20}, SX_{21}, SX_{22}, SX_{23}$]. The delayed values take the form $Sx_{ab}$ where: S denotes source; a=delay; and b=SP unit number (e.g. SP0, SP1, SP2, SP3). The y' and y'' values are of similar form, particularly, y'=[$SY_{10}, SY_{11}, SY_{12}, SY_{13}$] and y''=[$SY_{20}, SY_{21}, SY_{22}, SY_{23}$].

As shown in FIG. 7, DTAB 502A outputs source value $SX_0$ and $SY_0$ (where the subscripted value denotes the SP number) directly from the x and y input busses into the primary stage 561 of SP0. DTAB 502A also outputs shadow values $SHX_0$ and $SHY_0$ (where the subscripted value denotes the SP number) which are selected from the delayed data values (x', x'', y', and y''), respectively. These delayed values are stored in delayed data registers, as will be discussed, and are outputted via data busses 551A and 552A, respectively, to the shadow stage 562 of SP0. Similarly, DTAB 502B outputs source value $SX_1$ and $SY_1$ into the primary stage 561 and shadow values $SHX_1$ and $SHY_1$ via data busses 551B and 552B to the shadow stage 562 of SP1; DTAB 502C outputs source value $SX_2$ and $SY_2$ into the primary stage and shadow values $SHX_2$ and $SHY_2$ via data busses 551C and 552C to the shadow stage of SP2; and DTAB 502D outputs source value $SX_3$ and $SY_3$ into the primary stage and shadow values $SHX_3$ and $SHY_3$ via data busses 551D and 552D to the shadow stage of SP3.

As previously discussed, the Application Specific Signal Processor (ASSP) according to one embodiment of the present invention may be utilized in telecommunication systems to implement digital filtering functions. One common type of digital filter function is finite impulse response (FIR) filter having the form $Z_n = x_0 y_0 + x_1 y_1 + x_2 y_2 + \ldots + x_N y_N$ where $y_n$ are fixed filter coefficients numbering from 1 to N and $x_n$ are the data samples.

As shown in FIG. 8B, the FIR filter of the form $Z_0 = x_0 y_0 + x_1 y_1 + x_2 y_2 + \ldots + x_N y_N$ may be used with the present invention. The computations for this equation may be spread across the different (SPs) as shown in FIG. 8B and a specific portion of the equation can be computed during every cycle (denoted cycle #). For example, within the primary stages of the SPs, during cycle #1: SP0 computes $x_0 y_0$, SP1 computes $x_1 y_1$, SP2 computes $x_2 y_2$, and SP3 computes $x_3 y_3$, and during cycle #2: SP0 computes $x_4 y_4$, SP1 computes $x_5 y_5$, SP2 computes $x_6 y_6$, and SP3 computes $x_7 y_7$, etc. As previously discussed the single 40-bit Shadow DSP instruction includes a pair of 20-bit dyadic sub-instructions: a primary dyadic DSP sub-instruction that executes in the primary stage based upon current data and a shadow dyadic DSP sub-instruction that executes, simultaneously, in the shadow stage based upon delayed data locally stored within delayed data registers.

As shown in FIG. 8B, after cycle #1 and cycle #2 in which the delayed data (x', x'', y', and y'') is stored, the shadow stages can simultaneously calculate the next output of the FIR filter, using locally stored delayed data, of the form $Z_1 = x_1 y_0 + x_2 y_1 + x_3 y_2 + \ldots + x_{N+1} y_N$. In this example case, the control logic 700 specifies that the shadow stages shuffle the x' values left by one. The computations for this equation are spread across the shadow stages of the different SPs as shown in FIG. 8B and a specific portion of the equation can be computed during each cycle. For example during cycle #3: SP0 computes $x_1 y_0$, SP1 computes $x_2 y_1$, SP2 computes $x_3 y_2$, and SP3 computes $x_4 y_3$, and during cycle #4: SP0 computes $x_5 y_4$; SP1 computes $x_6 y_5$, SP2 computes $x_7 y_6$, and SP3 computes $x_8 y_7$, etc. In this way, the present invention efficiently executes DSP instructions by simultaneously executing primary DSP sub-instructions (based upon current data) and shadow DSP sub-instructions (based upon delayed locally stored data) with a single 40-bit extended shadow DSP instruction thereby performing four operations per single instruction cycle. Furthermore, as shown in FIG. 8B, subsequent cycles of the FIR filter can be simultaneously computed using the primary and shadow stages.

The shadow stage computations shown in FIG. 8B utilize data that it is delayed and locally stored to increase the efficiency of the digital signal processing by the SP. Cycle #3 of the shadow stage computations utilizes the first 3 x operands ($x_1, x_2,$ and $x_3$) of cycle #1 of the primary stage and the first x operand ($x_4$) of cycle #2 of the primary stage and the y operands remain the same. Thus, for the shadow stage computations the $x_0$ operand is discarded and the x' operands of the primary stage are simply "shuffled left" by one and re-used. This same "shuffle left" operation is clearly shown in cycle #4 of the shadow stage computations.

The ereg1 and ereg2 fields of the shadow DSP sub-instruction (FIGS. 6E and 6I), previously discussed, specify to the control logic 700 the data to be selected. For the values SX1 (denoting x'), SX2 (denoting x''), SY1 (denoting y'), and SY2 (denoting y''), specified in the ereg fields, the control logic simply selects the specified delayed data for the shadow stages without shuffling. Also, the shadow stages can use data from the accumulator as specified by the ereg fields (e.g. A0, A1, T, TR).

FIGS. 8C illustrates a shuffle control register 702 according to one embodiment of the present invention. For the values SX1s, SX2s, SY1s, and SY2s specified in the ereg fields, the shuffle control register 702 designates a preset shuffle control instruction to direct the control logic 700 to select delayed data in a shuffled manner for use by shadow stages 562 of the SPs 300. Based upon this preset instruction, the control logic 700 controls a shadow selector of each DTAB 502 of each SP 300 to select delayed data stored in delayed data registers for use by each shadow stage 562 of each SP 300, respectively. As shown in FIG. 8C, an exemplary bit map for a shuffle control register 702 for use with the control logic 700 is disclosed where the term u denotes SP unit number, e.g. u3=SP3, u2=SP2, u1=SP1, and u0=SP0. In this embodiment, sources are shuffled using the following bit diagram:

00 SP Unit N+1, SX1: denotes shuffling delayed data x' to the right by one.
01 SP Unit N+1, SX2: denotes shuffling delayed data x" to the right by one.
10 SP Unit N−1, SX1: denotes shuffling delayed data x' to the left by one.
11 SP Unit N−1, SX2: denotes shuffling delayed data x" to the left by one.

For example, to shuffle delayed data x' to the left by one as illustrated in FIG. 8B and as previously described, the following bits would be programmed into the u3, u2, u1, and u0 bit fields (bits 0–7) of the SX1s portion of the bit map for the shuffle control register 702: 10101010. Similar coding can be used to shuffle delayed y data (e.g. y' and y") as well.

It will be appreciated by those skilled in the art that the control logic can be programmed to shuffle delayed data values left or right by one step as disclosed in the bit map for the shuffle control register in FIG. 8C. Furthermore, it should be appreciated that the shuffle control register could also be programmed to shuffle delayed data by any number of steps (e.g. one, two, three . . . ) in either direction. Additionally, it will be appreciated by those skilled in the art that a wide a variety of block digital filters can be implemented with the present invention besides the FIR filter previously described with reference to FIG. 8.

FIG. 9a illustrates the architecture of a data typer and aligner (DTAB) 502 of a signal processing unit 300 to select current data for the primary stage 561 and delayed data for use by the shadow stage 562 of an SP from the x bus 531. Particularly, FIG. 9a illustrates DTAB 502C of SP2 300C (shown in FIG. 7) to select source value $SX_2$ for output to the primary stage 561, as specified by the primary DSP sub-instruction, and to select shadow value $SHX_2$ from delayed data, x' and x", for output to the shadow stage 562 as specified by the shadow DSP sub-instruction.

DTAB 502C includes a main control 904 that provides a main control signal to control a main multiplexer 906C to select SX2 for output to the primary stage 561 of SP 300C in accordance with the primary DSP sub-instruction. The main control signal also provides data typing and formatting.

DTAB 502C further includes a shadow selector, such as a shadow multiplexer 912C, to select shadow value $SHX_2$ from the delayed data, x' and x", as specified by a shuffle multiplexer control signal 914 generated by the control logic 700. The control logic 700, in conjunction with the shuffle control register 702, implements the requested delayed data selection of the shadow DSP sub-instruction, as previously discussed, by generating and transmitting the shuffle multiplexer control signal 914 to the shadow multiplexer 912C.

In accordance with shuffle multiplexer control signal 914, the shadow multiplexer 912C selects the specified delayed data value from, x'=[$SX_{10}$, $SX_{11}$, $SX_{12}$, $SX_{13}$] and x"=[$SX_{20}$, $SX_{21}$, $SX_{22}$, $SX_{23}$] (as previously discussed). The x' delayed data values are stored in $\text{Register}_{2x'}$ 908C and the x" delayed data values are stored in $\text{Register}_{2x''}$ 910C for access by the shadow multiplexer 912C. Also control delay 916C provides a delayed main control signal for the proper timing of the shadow multiplexer 912C. The delayed main control signal also provides data typing and formatting.

Based upon the shuffle multiplexer control signal 914, the shadow multiplexer 512C selects the shadow value $SHX_2$ from the delayed data values and outputs it to the shadow stage 562 of SP 300C via data bus 551C.

It should be appreciated that DTABs 502A, 502B, 502C, and 502D of SP0 300A, SP1 300B, SP2 300C, and SP3 300D, respectively, for selecting delayed x data values are all of similar architecture as described in FIG. 9a. Furthermore, it should be appreciated that each DTAB 502A, 502B, 502C, and 502D, has a shadow multiplexer 912A, 912B, 912C, and 912D, respectively, which will be discussed in detail later.

FIG. 9b illustrates the architecture of a data typer and aligner (DTAB) 502 of a signal processing unit 300 to select current data for the primary stage 561 and delayed data for use by the shadow stage 562 of an SP from the y bus 533. Particularly, FIG. 9b illustrates DTAB 502C of SP2 300C (shown in FIG. 7) to select source value $SY_2$ for output to the primary stage 561, as specified by the primary DSP sub-instruction, and to select shadow value $SHY_2$ from delayed data, y' and y", to output to the shadow stage 562 as specified by the shadow DSP sub-instruction.

DTAB 502C includes a main control 904 (FIG. 9a) that provide a main control signal to control a main multiplexer 907C to select SY2 for output to the primary stage 561 of the SP 300C in accordance with the primary DSP sub-instruction. The main control signal also provides data typing and formatting.

DTAB 502C further includes a shadow selector, such as a shadow multiplexer 913C, to select shadow value $SHY_2$ from the delayed data, y' and y", as specified by a shuffle multiplexer control signal 915 generated by the control logic 700. The control logic 700, in conjunction with the shuffle control register 702, implements the requested delayed data selection of the shadow DSP sub-instruction, as previously discussed, by generating and transmitting the shuffle multiplexer control signal 915 to the shadow multiplexer 913C.

In accordance with shuffle multiplexer control signal 915, the shadow multiplexer 913C selects the specified delayed data value from, y'=[$SY_{10}$, $SY_{11}$, $SY_{12}$, $SY_{13}$] and y"=[$SY_{20}$, $SY_{21}$, $SY_{22}$, $SY_{23}$] (as previously discussed) . The y' delayed data values are stored in $\text{Register}_{2y'}$ 909C and the y" delayed data values are stored in $\text{Register}_{2y''}$ 911C for access by the shadow multiplexer 913C. Also control delay 916C (FIG. 9a) provides a delayed main control signal for the proper timing of the shadow multiplexer 913C. The main control signal also provides data typing and formatting. Based upon the shuffle multiplexer control signal 915, the shadow multiplexer 513C selects the shadow value $SHY_2$ from the delayed data values and outputs it to the shadow stage 562 of SP 300C via data bus 552C.

It should be appreciated that DTABs 502A, 502B, 502C, and 502D of SP0 300A, SP1 300B, SP2 300C, and 300D, respectively, for selecting delayed y data values are all of similar architecture as described in FIG. 9b. Furthermore, it should be appreciated that each DTAB 502A, 502B, 502C, and 502D, has a shadow multiplexer 913A, 913B, 913C, and 913D, respectively. FIGS. 10a–10d illustrate the architecture of each shadow multiplexer 912 for each data typer and aligner (DTAB) 502 of each signal processing units (SP) 300 to select x' and x" delayed data from the delayed data registers (e.g. Register$_{x'}$ 908 Register$_{x''}$ 910) for use by the shadow stages 562 of the SPs.

Figure 10A:
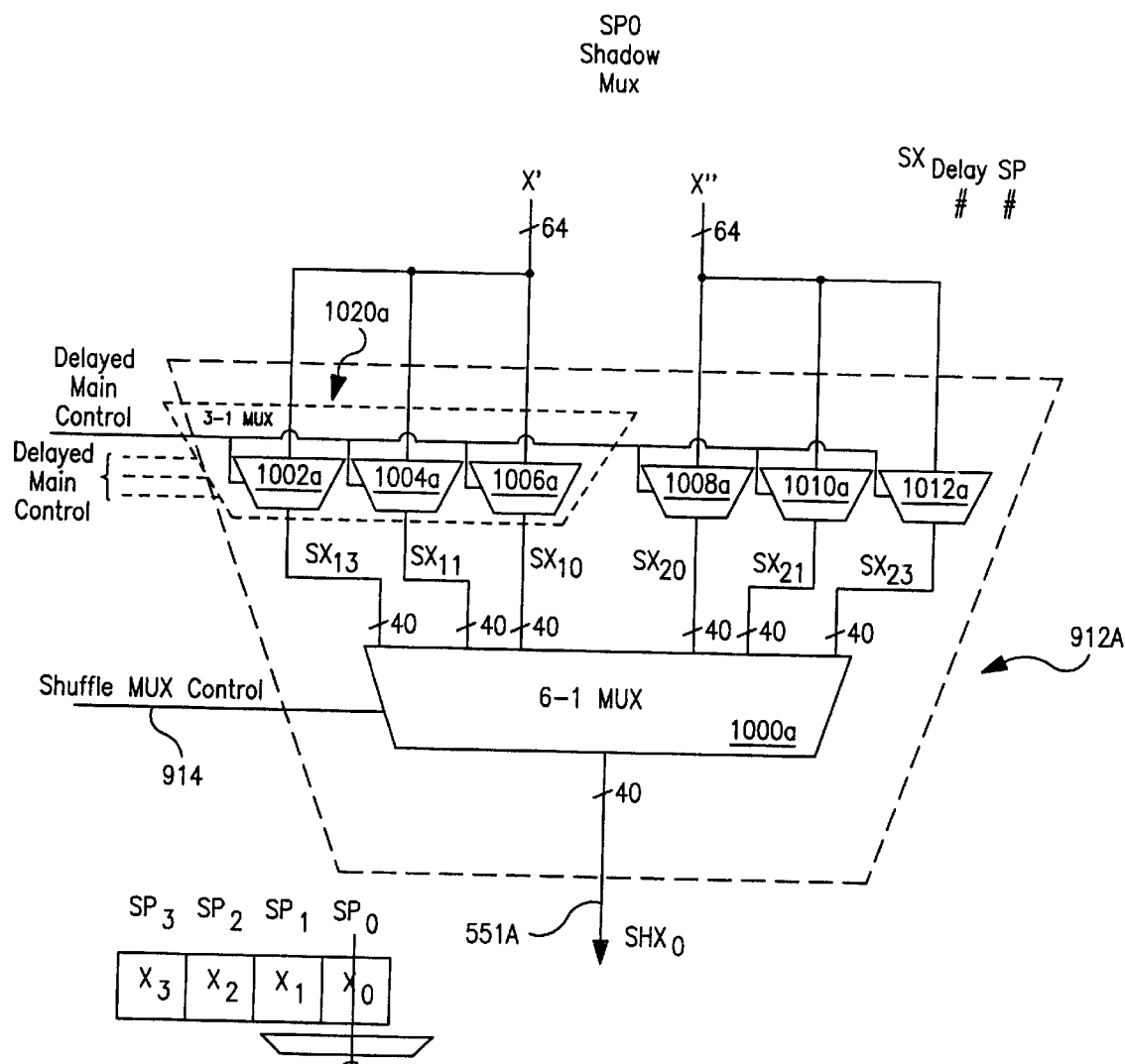

FIG. 10a illustrates the architecture of the shadow multiplexer 912A of DTAB 502A for SP0 300A. The shadow multiplexer 912A can select delayed x values (x' and x" ) as directed by the shuffle multiplexer control signal 914 (e.g. shuffle left or right by one or no shuffle), to select the shadow value SHX$_0$. The shadow value SHX$_0$ is then outputted to the shadow stage 562 of SP 300A via data bus 551A. As previously discussed, x'=[SX$_{10}$, SX$_{11}$, SX$_{12}$, SX$_{13}$] and x" =[SX$_{20}$, SX$_{21}$, SX$_{22}$, SX$_{23}$] where the values take the form Sx$_{ab}$ in which: S denotes source; a=delay; and b=SP unit number (e.g. SP0, SP1, SP2, SP3).

The shadow multiplexer 912A includes a 6-1 multiplexer 1000a for selecting one of SX$_{13}$, SX$_{11}$, SX$_{10}$, SX$_{20}$, SX$_{21}$, SX$_{23}$ as directed by the shuffle multiplexer control signal 914. The shadow multiplexer 912A further includes a plurality of three multiplexers 1002a, 1004a, 1006a, for selecting SX$_{13}$, SX$_{11}$, and SX$_{10}$, respectively. Each multiplexer is also connected to the delayed main control signal for proper timing. The delayed main control signal also provides data typing and formatting. Alternatively, a 3-1 multiplexer 1020a could be used for any plurality of three multiplexers. The shadow multiplexer 912A also includes another plurality of three multiplexers 1008a, 1010a, 1012a, for selecting SX$_{20}$, SX$_{21}$, SX$_{23}$ respectively.

Based upon the shuffle multiplexer control signal 914, the shadow multiplexer 912A via 6-1 multiplexer 1000a selects one of SX$_{13}$, SX$_{11}$, SX$_{10}$, SX$_{20}$, SX$_{21}$, SX$_{23}$ for the shadow value SHX$_0$ to output to the shadow stage 562 of SP0 300A via data bus 551A. As previously discussed, the control logic 700, in conjunction with the shuffle control register 702, implements the requested delayed data selection of the shadow DSP sub-instruction by generating and transmitting the shuffle multiplexer control signal 914 to the 6-1 multiplexer 1000a.

For example, if ereg1 of the shadow DSP sub-instruction specifies SX1s which, as discussed in the previous example of FIG. 8B, is programmed to be a shuffle delayed data x' to the left by one then the 6-1 multiplexer 1000a would pick the delayed data value SX$_{11}$ as shadow value SHX$_0$ to be outputted to the shadow stage. In the example of FIG. 8b under Shadow Stage Computations at Cycle #3, this corresponds to picking x$_1$ which can then be multiplied y$_0$ yielding x$_1$y$_0$ to be computed by SP0. Alternatively, if ereg1 is set to SX1 (denoting pick delayed data x' without shuffling) the control logic 700 doesn't use the shuffle control register 702 and via the shuffle multiplexer control signal 914 directs multiplexer 1000a to pick the delayed data value SX$_{10}$ as the shadow value SHX$_0$ to be outputted to the shadow stage.

It should be appreciated that as previously discussed that shuffle multiplexer control signal can control multiplexer 1000a to pick one of the values SX$_{13}$, SX$_{11}$, SX$_{21}$, SX$_{23}$ to shuffle the x' and x" delayed data left or right by one as programmed by the shuffle control register 702. Further, in other embodiments, the shuffle control register 702 could be programmed to shuffle delayed data by any number of steps (e.g. one, two, three . . . ) in either direction.

Figure 10B:
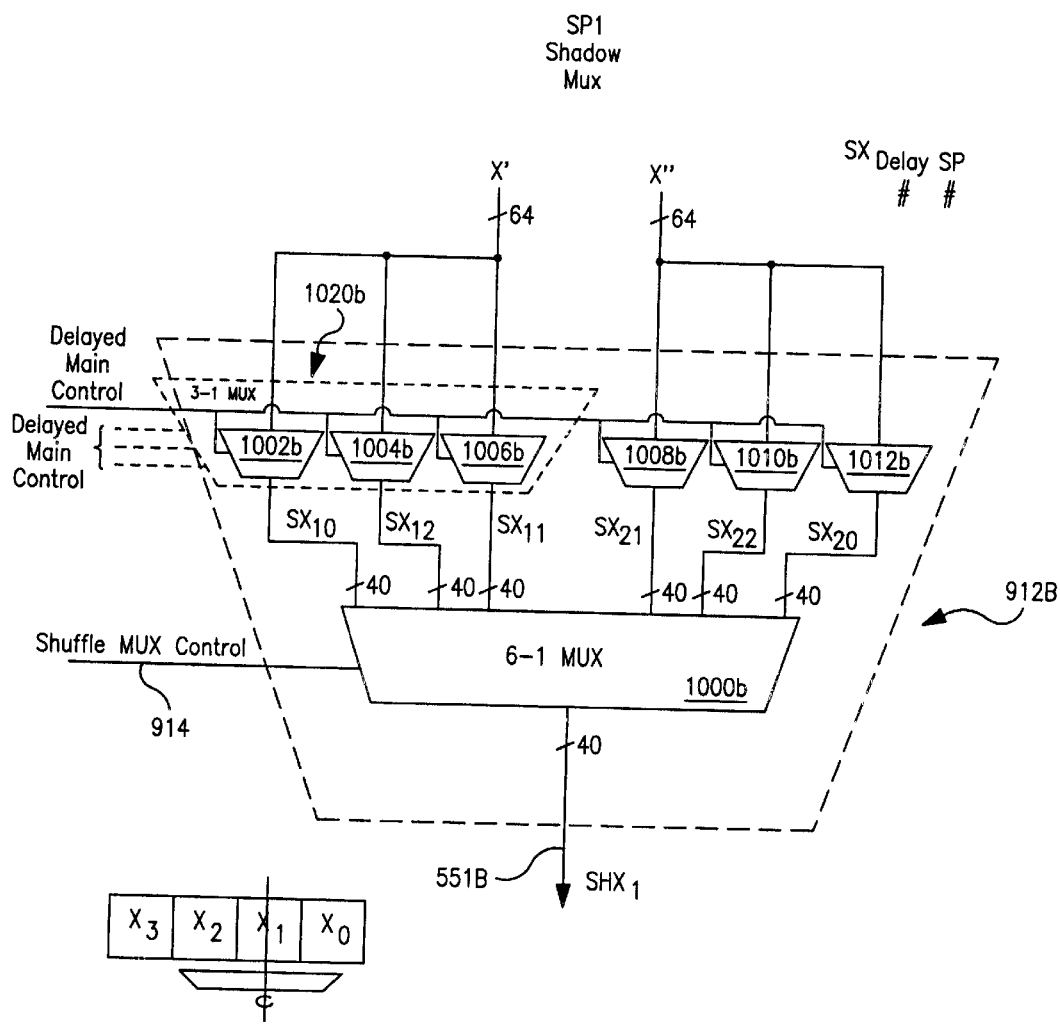
Figure 10C:
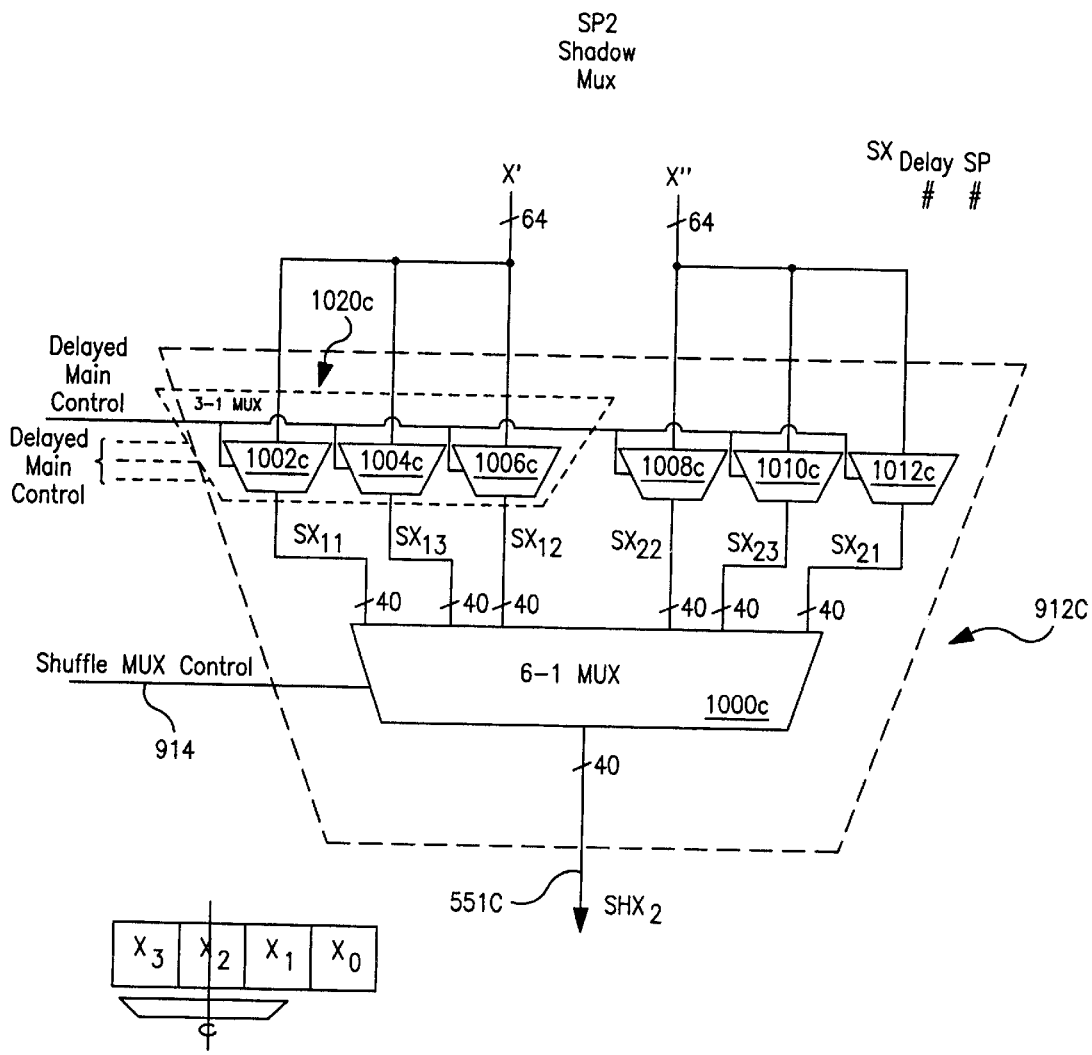
Figure 10D:
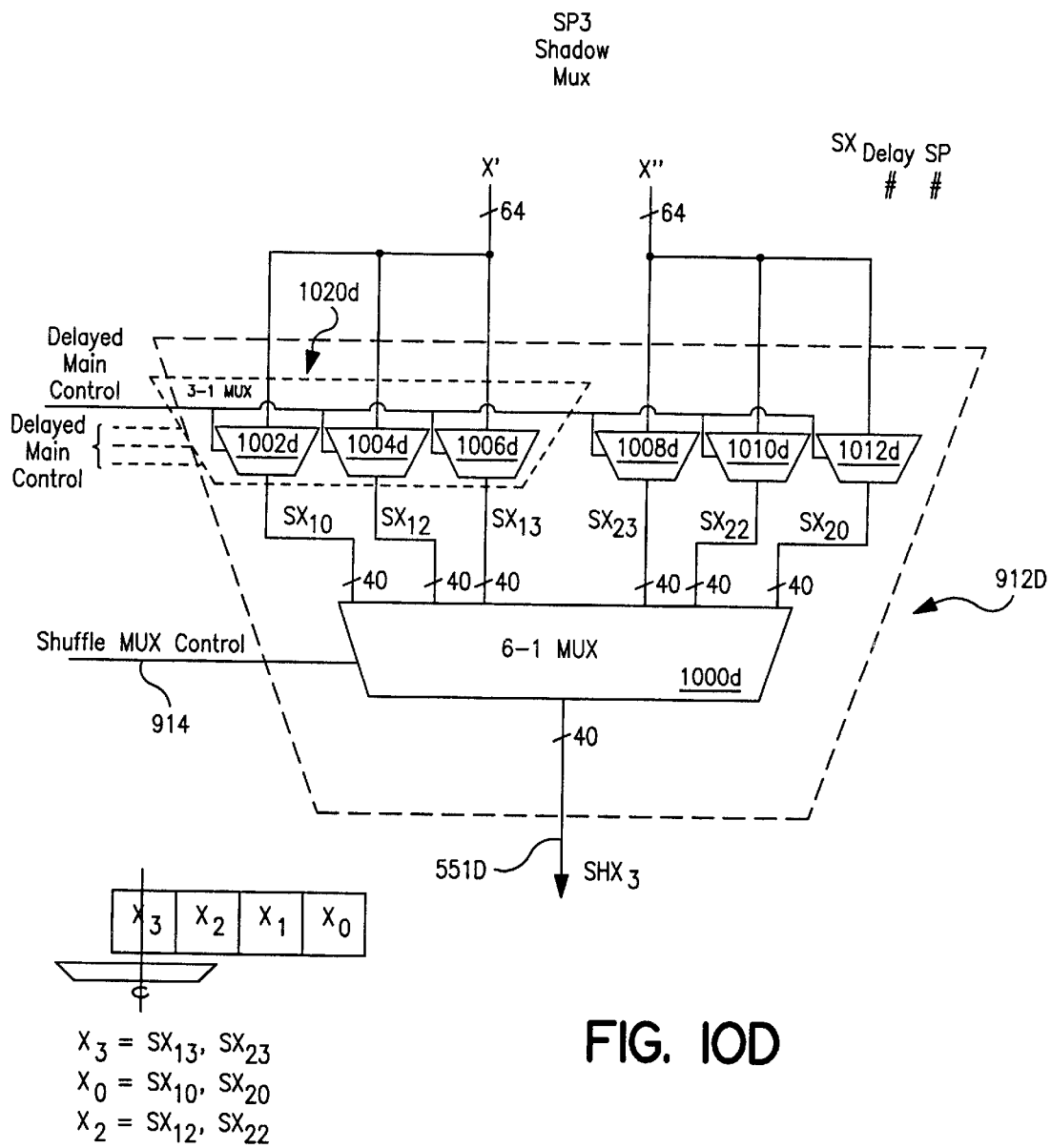

The architecture of the other shadow multiplexers 912B, C,D for DTABs 502B,C,D of the other SPs 300B,C,D to select x' and x" delayed data for use by the shadow stages 562, is substantially the same as that previously described for shadow multiplexer 912A, as can be seen in FIGS. 10b–10d. Therefore, shadow multiplexers 912B,C,D will only be briefly described for brevity, as it should be apparent to those skilled in the art, that the previous explanation of multiplexer 912A applies to the description of shadow multiplexers 912B,C,D.

FIG. 10b illustrates the architecture of the shadow multiplexer 912B of DTAB 562B for SP1 300B. The shadow multiplexer 912B can select delayed x values (x' and x") as directed by the shuffle multiplexer control signal 914 (e.g. shuffle left or right by one or no shuffle), to select the shadow value SHX$_1$. The shadow value SHX$_1$ is then outputted to the shadow stage 562 of SP 300B via data bus 551B. The shadow multiplexer 912B includes a 6-1 multiplexer 1000b for selecting one of SX$_{10}$, SX$_{12}$, SX$_{11}$, SX$_{21}$, SX$_{22}$, SX$_{20}$ as directed by the shuffle multiplexer control signal 914. The shadow multiplexer 912A further includes a plurality of three multiplexers 1002b, 1004b, 1006b, for selecting SX$_{10}$, SX$_{12}$, and SX$_{11}$, respectively. The shadow multiplexer 912B also includes another plurality of three multiplexers 1008b, 1010b, 1012b, for selecting SX$_{21}$, SX$_{22}$, SX$_{20}$, respectively. Based upon the shuffle multiplexer control signal 914, the shadow multiplexer 912B via 6-1 multiplexer 1000b selects one of SX$_{10}$, SX$_{12}$, SX$_{11}$, SX$_{21}$, SX$_{22}$, SX$_{20}$ for the shadow value SHX1 to output to the shadow stage 562 of SP1 300B via data bus 551B. As previously discussed, the control logic 700, in conjunction with the shuffle control register 702, implements the requested delayed data selection of the shadow DSP sub-instruction by generating and transmitting the shuffle multiplexer control signal 914 to the 6-1 multiplexer 1000b.

For example, if ereg1 of the shadow DSP sub-instruction specifies SX1s which, as discussed in the previous example of FIG. 8B, is programmed to be a shuffle delayed data x' to the left by one then the 6-1 multiplexer 1000b would pick the delayed data value SX$_{12}$ as shadow value SHX$_1$ to be outputted to the shadow stage. In the example of FIG. 8b under Shadow Stage Computations at Cycle #3, this corresponds to picking x$_2$ which can then be multiplied y$_1$ yielding x$_2$y$_1$ to be computed by SP1. Alternatively, if ereg1 is set to SX1 (denoting pick delayed data x' without shuffling) the control logic 700 doesn't use the shuffle control register 702 and via the shuffle multiplexer control signal 914 directs multiplexer 1000b to pick the delayed data value SX$_{11}$ as the shadow value SHX$_1$ to be outputted to the shadow stage.

FIG. 10c illustrates the architecture of the shadow multiplexer 912C of DTAB 502C for SP2 300C. The shadow multiplexer 912C can select delayed x values (x' and x") as directed by the shuffle multiplexer control signal 914 (e.g. shuffle left or right by one or no shuffle), to select the shadow value SHX$_2$. The shadow value SHX$_2$ is then outputted to the shadow stage 562 of SP 300C via data bus 551C. The shadow multiplexer 912C includes a 6-1 multiplexer 1000c for selecting one of SX$_{11}$, SX$_{13}$, SX$_{12}$, SX$_{22}$, SX$_{23}$, SX$_{21}$ as directed by the shuffle multiplexer control signal 914. The shadow multiplexer 912C further includes a plurality of three multiplexers 1002c, 1004c, 1006c, for selecting SX$_{11}$, SX$_{13}$, SX$_{12}$, respectively. The shadow multiplexer 912C also includes another plurality of three multiplexers 1008c, 1010c, 1012c, for selecting SX$_{22}$, SX$_{23}$, SX2$_1$, respectively. Based upon the shuffle multiplexer control signal 914, the shadow multiplexer 912C via 6-1 multiplexer 1000c selects one of $SX_{11}$, $SX_{13}$, $SX_{12}$, $SX_{22}$, $SX_{23}$, $SX_{21}$ for the shadow value $SHX_2$ to output to the shadow stage 562 of SP2 300C via data bus 551C. As previously discussed, the control logic 700, in conjunction with the shuffle control register 702, implements the requested delayed data selection of the shadow DSP sub-instruction by generating and transmitting the shuffle multiplexer control signal 914 to the 6-1 multiplexer 1000*c*.

For example, if ereg1 of the shadow DSP sub-instruction specifies SX1s which, as discussed in the previous example of FIG. 8B, is programmed to be a shuffle delayed data x' to the left by one then the 6-1 multiplexer 1000*c* would pick the delayed data value $SX_{13}$ as shadow value $SHX_2$ to be outputted to the shadow stage. In the example of FIG. 8*b* under Shadow Stage Computations at Cycle #3, this corresponds to picking $x_3$ which can then be multiplied $y_2$ yielding $x_3y_2$ to be computed by SP2. Alternatively, if ereg1 is set to SX1 (denoting pick delayed data x' without shuffling) the control logic 700 doesn't use the shuffle control register 702 and via the shuffle multiplexer control signal 914 directs multiplexer 1000*c* to pick the delayed data value $SX_{12}$ as the shadow value $SHX_2$ to be outputted to the shadow stage.

FIG. 10*d* illustrates the architecture of the shadow multiplexer 912D of DTAB 502D for SP3 300D. The shadow multiplexer 912D can select delayed x values (x' and x") as directed by the shuffle multiplexer control signal 914 (e.g. shuffle left or right by one or no shuffle), to select the shadow value $SHX_3$. The shadow value $SHX_3$ is then outputted to the shadow stage 562 of SP 300D via data bus 551D. The shadow multiplexer 912D includes a 6-1 multiplexer 1000*d* for selecting one of $SX_{10}$, $SX_{12}$, $SX_{13}$, $SX_{23}$, $SX_{22}$, $SX_{20}$ as directed by the shuffle multiplexer control signal 914. The shadow multiplexer 912D further includes a plurality of three multiplexers 1002*d*, 1004*d*, 1006*d*, for selecting $SX_{10}$, $SX_{12}$, $SX_{13}$, respectively. The shadow multiplexer 912D also includes another plurality of three multiplexers 1008*d*, 1010*d*, 1012*d*, for selecting $SX_{23}$, $SX_{22}$, $SX_{20}$, respectively. Based upon the shuffle multiplexer control signal 914, the shadow multiplexer 912D via 6-1 multiplexer 1000*d* selects one of $SX_{10}$, $SX_{12}$, $SX_{13}$, $SX_{23}$, $SX_{22}$, $SX_{20}$ for the shadow value $SHX_3$ to output to the shadow stage 562 of SP3 300D via data bus 551D. As previously discussed, the control logic 700, in conjunction with the shuffle control register 702, implements the requested delayed data selection of the shadow DSP sub-instruction by generating and transmitting the shuffle multiplexer control signal 914 to the 6-1 multiplexer 1000*d*.

For example, if ereg1 of the shadow DSP sub-instruction specifies SX1s which, as discussed in the previous example of FIG. 8B, is programmed to be a shuffle delayed data x' to the left by one then the 6-1 multiplexer 1000*d* would pick the delayed data value $SX_{20}$ as shadow value $SHX_3$ to be outputted to the shadow stage. Thus, in this instance, the value comes from the x" delayed data. In the example of FIG. 8*b* under Shadow Stage Computations at Cycle #3, this corresponds to picking $x_4$ which can then be multiplied $y_3$ yielding $x_4y_3$ to be computed by SP3. Alternatively, if ereg1 is set to SX1 (denoting pick delayed data x' without shuffling) the control logic 700 doesn't use the shuffle control register 702 and via the shuffle multiplexer control signal 914 directs multiplexer 1000*d* to pick the delayed data value $SX_{13}$ as the shadow value $SHX_3$ to be outputted to the shadow stage.

As previously discussed each DTAB 502A, 502B, 502C, and 502D, has a shadow multiplexer 913A, 913B, 913C, and 913D, respectively, to select y' and y" delayed data from delayed data registers for use by the shadow stages 562 of the SPs. It should be appreciated by those skilled in the art that the architecture of these shadow multiplexers for selecting y' and y" delayed data is substantially the same as that previously described for the shadow multiplexers 912A, 912B, 912C, and 912D with reference to FIGS. 10*a*–10*d*, and that these shadow multiplexers function in substantially the same way using y' and y" delayed data instead of x' and x" delayed data. Therefore, for brevity, they will not be described.

Referring now to FIG. 11, a block diagram illustrates the instruction decoding for configuring the blocks of the signal processing units (SPs) 300A–D. A Shadow DSP instruction 1104 including a primary DSP sub-instruction and a shadow DSP sub-instruction enters a predecoding block 1102. The predecoding block 1102 is coupled to each data typer and aligner block (DTAB) 502A, 502B, 502C, and 502D of each SP, respectively, to provide main control signals to select source values (e.g. $SX_0$, $SX_1$, $SX_2$, $SX_3$ etc.) for output to the primary stages 561 of the SPs 300 in accordance with the primary DSP sub-instruction. The main control signal also provides data typing and formatting for both the source values and the shadow values (e.g. $SHX_0$ $SHX_1$ $SHX_2$ $SHX_3$ etc.)

As shown in FIG. 11, the control logic 700 and shuffle control register 702 are coupled to the shadow multiplexers (912A, 913A, 912B, 913B etc.) to provide the shuffle multiplexer control signals 914 and 915 to the shadow multiplexers. As previously discussed, the shuffle multiplexer control signal causes the shadow multiplexers to select shadow values SHX from delayed data to implement the requested delayed data selection of the shadow DSP sub-instruction.

Each signal processor 300 includes the final decoders 1110A through 1110N, and multiplexers 1110A through 1110N. The multiplexers 1110A through 1110N are representative of the multiplexers 514A, 516, 520A, 520B, 522, 520C, and 514B in FIG. 5B. The predecoding 1102 is provided by the RISC control unit 302 and the pipe control 304. An instruction is provided to the predecoding 1102 such as a Shadow DSP instruction 1104. The predecoding 1102 provides preliminary signals to the appropriate final decoders 1110A through 1110N on how the multiplexers 1120A through 112ON are to be selected for the given instruction.

Referring back to FIG. 5B, in the primary dyadic DSP sub-instruction of the single 40-bit extended Shadow DSP instruction, the MAIN OP and SUB OP are generally performed by the blocks of the multiplier M1 504A, compressor 506, adder A1 510A, and adder A2 510B. The result is stored in one of the registers within the accumulator register AR 512.

For example, if the primary dyadic DSP sub-instruction is to perform a MULT and an ADD, then the MULT operation of the MAIN OP is performed by the multiplier M1 504A and the SUB OP is performed by the adder A1 510A. The predecoding 1102 and the final decoders 1110A through 1110N appropriately select the respective multiplexers 1120A and 1120N to select the MAIN OP to be performed by multiplier M1 504A and the SUB OP to be performed by adder A1 510A. In the exemplary case, multiplexer 514A selects inputs from the data typer and aligner 502 in order for multiplier M1 504A to perform the MULT operation, multiplexer 520A selects an output from the data typer and aligner 502 for adder A1 510 to perform the ADD operation, and multiplexer 522 selects the output from adder 510A for accumulation in the accumulator 512. The MAIN OP and SUB OP can be either executed sequentially (i.e. serial execution on parallel words) or in parallel (i.e. parallel execution on parallel words). If implemented sequentially, the result of the MAIN OP may be an operand of the SUB OP.

For the shadow dyadic DSP sub-instruction of the Shadow DSP instruction, the MAIN OP and SUB OP are generally performed by the blocks of the adder A3 510C and multiplier M2 504B. The result is stored in one of the registers within the accumulator register AR 512.

For example, if the shadow dyadic DSP sub-instruction is to perform a MULT and an ADD, then the MULT operation of the MAIN OP is performed by the multiplier M2 504B and the SUB OP is performed by the adder A3 510C. The predecoding 1102 and the final decoders 1110A through 1110N appropriately select the respective multiplexers 1120A through 1120N to select the MAIN OP to be performed by multiplier M2 504B and the SUB OP to be performed by adder A3 510C. In the exemplary case, multiplexer 514B selects inputs (e.g. Shadow values SHX) from the data typer and aligner 502 in order for multiplier M2 504B to perform the MULT operation, multiplexer 520C selects an output from the accumulator 512 for adder A3 510C to perform the ADD operation, and multiplexer 522 selects the output from multiplier M2 504B for accumulation in the accumulator 512. Again, as in the primary stage, the MAIN OP and SUB OP can be either executed sequentially (i.e. serial execution on parallel words) or in parallel (i.e. parallel execution on parallel words). If implemented sequentially, the result of the MAIN OP may be an operand of the SUB OP.

The final decoders 1110A through 1110N have their own control logic to properly time the sequence of multiplexer selection for each element of the signal processor 300 to match the pipeline execution of how the MAIN OP and SUB OP are executed, including sequential or parallel execution. The RISC control unit 302 and the pipe control 304 in conjunction with the final decoders 1110A through 1110N pipelines instruction execution by pipelining the instruction itself and by providing pipelined control signals. This allows for the data path to be reconfigured by the software instructions each cycle.

As those of ordinary skill will recognize, the present invention has many advantages. One advantage of the present invention is that the ISA is adapted to DSP algorithmic structures providing compact hardware to consume low-power which can be scaled to higher computational requirements. Another advantage of the present invention is that the signal processing units have direct access to operands in memory to reduce processing overhead associated with load and store instructions. Another advantage of the present invention is that pipelined instruction execution is provided so that instructions may be issued every cycle. Another advantage of the present invention is that the signal processing units can be configured cycle by cycle. A further advantage of the present invention is that it efficiently executes DSP instructions by use of the Shadow DSP instruction which allows for the simultaneously execution of the primary DSP sub-instruction(based upon current data) and the shadow DSP sub-instruction (based upon delayed locally stored data) thereby performing four operations per single instruction cycle.

The preferred embodiments of the present invention are thus described. While the present invention has been described in particular embodiments, it may be implemented in hardware, software, firmware or a combination thereof and utilized in systems, subsystems, components or subcomponents thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims that follow below.

What is claimed is:

1. A signal processor for performing digital signal processing instructions, the signal processor comprising:
   at least one signal processing unit including,
   a primary stage to execute a primary digital signal processing sub-instruction of a single digital signal processing instruction based upon current data; and
   a shadow stage to simultaneously execute a shadow digital signal processing sub-instruction of the single digital signal processing instruction based upon delayed data wherein, the shadow digital signal processing sub-instruction is a dyadic instruction having a shadow main operation and a shadow sub operation.

2. The signal processor of claim 1 for performing digital signal processing instructions, wherein, the primary digital signal processing sub-instruction is a dyadic instruction having a primary main operation and a primary sub operation.

3. The signal processor of claim 2 for performing digital signal processing instructions, wherein,
   the primary main operation of the primary digital signal processing sub-instruction is one of the set of multiplication, addition, comparison with a minimum or maximum value, and no operation.

4. The signal processor of claim 3 for performing digital signal processing instructions, wherein,
   the primary sub operation of the primary digital signal processing sub-instruction is one of the set of multiplication, addition, comparison with a minimum or maximum value, and no operation which differs from the first main operation.

5. The signal processor of claim 1 for performing digital signal processing instructions, wherein:
   the primary stage includes a first multiplier and a first adder;
   the shadow stage includes a second multiplier and a second adder;
   each of the first and second adders and the first and second multipliers have a multiplexer at their respective inputs to configure the signal processing unit to simultaneously execute the primary and shadow digital signal processing sub-instructions, respectively; and
   the at least one signal processing unit further includes an accumulator having registers to couple to the first multiplier or the first adder of the primary stage to provide operands or to store results therefrom for the primary digital signal processing sub-instruction and to couple to the second multiplier or the second adder of the shadow stage to provide operands or to store results therefrom for the shadow digital signal processing sub-instruction, respectively, the accumulator having registers to couple to a buffer memory to store digital signal processed outputs generated by the primary and shadow digital signal processing sub-instructions, respectively.

6. The signal processor of claim 5 for performing digital signal processing instructions, the signal processing unit further comprising a plurality of delayed data registers to store the delayed data for use by the shadow stage.

7. The signal processor of claim 6 for performing digital signal processing instructions, the signal processing unit further comprising:
 a shadow selector coupled to the delayed data registers to select delayed data for use by the shadow stage; and
 control logic coupled to the shadow selector to control the selection of the delayed data.

8. The signal processor of claim 5 for performing digital signal processing instructions, the signal processor further comprising:
 a plurality of signal processing units, each signal processing unit having a plurality of delayed data registers to store the delayed data and a shadow selector coupled to each of the delayed data registers; and
 control logic coupled to each shadow selector to control each shadow selector in selecting delayed data from the delayed data registers for use by the shadow stage of each signal processing unit, respectively.

9. The signal processor of claim 5 for performing digital signal processing instructions, the signal processor further comprising:
 a reduced instruction set computer (RISC) control unit and a pipeline controller to predecode the primary and shadow digital signal processing sub-instructions into a plurality of preliminary instruction execution signals; and
 wherein the at least one signal processing unit further includes
 a plurality of final decoders coupled to a plurality of multiplexers, each of the first and second adders and first and second multipliers having an input multiplexer from the plurality of multiplexers to receive operands responsive to the selection by those of the plurality of final decoders coupled thereto.

10. The signal processor of claim 9 for performing digital signal processing instructions, wherein,
 the RISC control unit includes three adders, a memory address generator, a multiplier, and a barrel shifter to predecode the primary and shadow digital signal processing sub-instructions into the plurality of preliminary instruction execution signals.

11. The signal processor of claim 10 for performing digital signal processing instructions, the signal processor further comprising:
 a data memory coupled to the RISC control unit and the at least one signal processing unit for storing operands and results of the execution of the primary and shadow digital signal processing sub-instructions; and
 a program memory coupled to the pipeline control, the program memory to store the primary and shadow digital signal processing sub-instructions for execution by the at least one digital signal processing unit.

12. The signal processor of claim 1 for performing digital signal processing instructions, wherein,
 the shadow main operation of the shadow digital signal processing sub-instruction is one of the set of multiplication, addition, comparison with a minimum or maximum value, and no operation.

13. The signal processor of claim 12 for performing digital signal processing instructions, wherein,
 the shadow sub operation of the shadow digital signal processing sub-instruction is one of the set of multiplication, addition, comparison with a minimum or maximum value, and no operation which differs from the second main operation.

14. The signal processor of claim 1 for performing digital signal processing instructions, the signal processor further comprising:
 a host interface to interface to an external host computer;
 an external memory interface to read and write data to an external memory;
 clock and phase-locked loop to control the timing of operations of the application specific signal processor;
 a memory movement engine coupled to the buffer memory to transceive data thereto and therefrom; and
 wherein the at least one signal processing unit further includes,
 a data typer and aligner to order the bits of the operands for execution, a third adder to add operands together, and a compressor to compress more than two operands into a pair of operands.

15. A method of performing digital signal processing (DSP) instructions in a signal processor, the method comprising:
 executing a single DSP instruction having a primary DSP sub-instruction and a shadow DSP sub-instruction;
 storing data for use as delayed data; and
 generating selection signals to select the inputs of multiplexers of DSP functional blocks to execute the primary DSP sub-instruction within a primary stage of a signal processing unit based upon current data and to simultaneously execute the shadow DSP sub-instruction within a shadow stage of the signal processing unit based upon the delayed data.

16. The method of claim 15 of performing digital signal processing (DSP) instructions further comprising:
 selecting delayed data for use by the shadow stage; and
 controlling the selection of delayed data based upon the shadow DSP sub-instruction.

17. The method of claim 15 of performing digital signal processing (DSP) instructions, wherein,
 the signal processor comprises a plurality of signal processing units, each signal processing unit having a plurality of delayed data registers to store the delayed data and a shadow selector coupled to each of the delayed data registers, further comprising,
 selecting delayed data from the delayed data registers of the single processing units for use by the shadow stages of the signal processing units; and
 controlling the selection of the delayed data based upon the shadow DSP sub-instruction for use by the shadow stages of the signal processing units.

18. The method of claim 15 of performing digital signal processing (DSP) instructions, wherein, the primary digital signal processing sub-instruction is a dyadic instruction having a primary main operation and a primary sub operation.

19. The method of claim 18 of performing digital signal processing (DSP) instructions, wherein, the primary main operation and the primary sub operation are two different operations selected from the set of multiplication, addition, comparison with a minimum or maximum value, and no operation.

20. The method of claim 15 of performing digital signal processing (DSP) instructions, wherein, the shadow digital signal processing sub-instruction is a dyadic instruction having a shadow main operation and a shadow sub operation.

21. The method of claim 20 of performing digital signal processing (DSP) instructions, wherein,
the shadow main operation and the shadow sub operation are two different operations selected from the set of multiplication, addition, comparison with a minimum or maximum value, and no operation.

22. The method of claim 15 of performing digital signal processing (DSP) instructions, wherein,
the primary stage includes the DSP functional blocks of a first multiplier and a first adder to perform addition, subtraction and a comparison with a minimal value or a maximum value, and the shadow stage includes the DSP functional blocks of a second multiplier and a second adder to perform addition, subtraction and a comparison with a minimal value or a maximum value.

23. An instruction set architecture (ISA) for execution of operations within a digital signal processor (DSP), the instruction set architecture comprising:
a single DSP instruction having two sub-instructions, a primary DSP sub-instruction and shadow DSP sub-instruction; and
the single DSP instruction to accelerate calculations within the digital signal processor of the type where D=[(A operation one B) operation two C] where operation one is a main operation and operation two is a sub operation, and the main operation and the sub operation are separate signal processing operations.

24. The instruction set architecture (ISA) of claim 23 for execution of operations within a digital signal processor, wherein, the primary DSP sub-instruction is a dyadic instruction having a primary main operation and a primary sub operation to execute two operations.

25. The instruction set architecture (ISA) of claim 24 for execution of operations within a digital signal processor, wherein, the two operations of the primary DSP sub-instruction are DSP operations.

26. The instruction set architecture (ISA) of claim 25 for execution of operations within a digital signal processor, wherein, the DSP operations of the primary DSP sub-instruction are of the set of operations of multiplication, addition, extremum, and no operation.

27. The instruction set architecture (ISA) of claim 23 for execution of operations within a digital signal processor, wherein, the shadow DSP sub-instruction is a dyadic instruction having a shadow main operation and a shadow sub operation to execute two operations.

28. The instruction set architecture (ISA) of claim 27 for execution of operations within a digital signal processor, wherein, the two operations of the shadow DSP sub-instruction are DSP operations.

29. The instruction set architecture (ISA) of claim 28 for execution of operations within a digital signal processor, wherein, the DSP operations of the shadow DSP sub-instruction are of the set of operations of multiplication, addition, extremum, and no operation.

30. The instruction set architecture (ISA) of claim 23 for execution of operations within a digital signal processor, wherein, the primary DSP sub-instruction is a dyadic instruction having a primary main operation and a primary sub operation to execute two operations, and the shadow DSP sub-instruction is a dyadic instruction having a shadow main operation and a shadow sub operation to execute two operations, such that the single DSP instruction executes four operations in one single instruction.

31. The instruction set architecture (ISA) of claim 23 for execution of operations within a digital signal processor, wherein, the single DSP instruction is a 40 bit instruction.

32. A digital signal processing (DSP) instruction for execution in digital signal processor, the DSP instruction comprising:
a single DSP instruction including sub-instructions to be executed in one processor cycle;
a primary DSP sub-instruction, the primary DSP sub-instruction being a dyadic instruction having a primary main operation and a primary sub operation to execute two DSP operations; and
a shadow DSP sub-instruction being a dyadic instruction having a shadow main operation and a shadow sub operation to execute two DSP operations;
whereby the single DSP instruction executes four DSP operations in one processor cycle.

33. The digital signal processing (DSP) instruction of claim 32 for execution in a digital signal processor, wherein the DSP operations are of the set of operations of multiplication, addition, extremum, and no operation.

* * * * *